United States Patent [19]

Gray

[11] Patent Number: 4,602,350
[45] Date of Patent: Jul. 22, 1986

[54] DATA REORDERING MEMORY FOR USE IN PRIME FACTOR TRANSFORM

[75] Inventor: Joseph H. Gray, Berkeley, Calif.

[73] Assignee: TRW Inc., Redondo Beach, Calif.

[21] Appl. No.: 776,198

[22] Filed: Sep. 16, 1985

Related U.S. Application Data

[60] Division of Ser. No. 706,222, Feb. 27, 1985, which is a continuation-in-part of Ser. No. 310,469, Oct. 13, 1981, abandoned.

[51] Int. Cl.⁴ .............................................. G06F 7/00
[52] U.S. Cl. .................................... 364/900; 364/726
[58] Field of Search ... 364/900 MS File, 200 MS File, 364/726

[56] References Cited

U.S. PATENT DOCUMENTS

| 3,731,284 | 5/1973 | Thies | 364/726 |
| 3,748,451 | 7/1973 | Ingwersen | 364/728 |
| 3,943,347 | 3/1976 | Martinson | 364/900 |
| 4,393,457 | 7/1983 | New | 364/200 |
| 4,477,878 | 10/1984 | Cope | 364/726 |

*Primary Examiner*—David H. Malzahn
*Attorney, Agent, or Firm*—David E. Lovejoy; Robert J. Stern

[57] ABSTRACT

A data reordering memory for writing data into the memory in one order and reading data out of the memory in a different order. The data reordering facilitates the processing of the data by a prime factor discrete Fourier transform processor.

5 Claims, 12 Drawing Figures

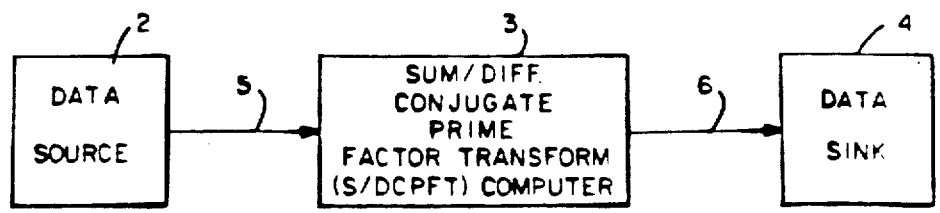
FIG.—1
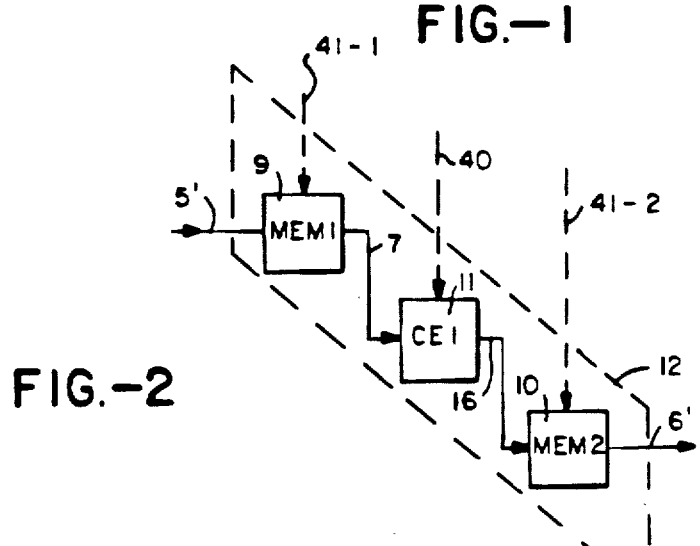
FIG.—2
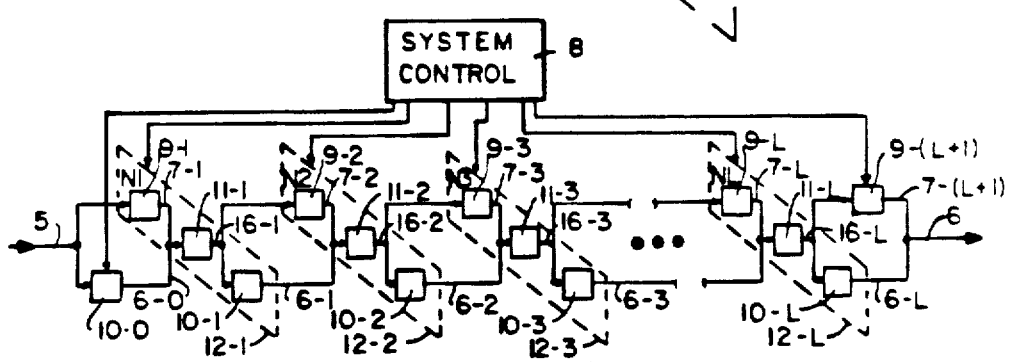
FIG.—3
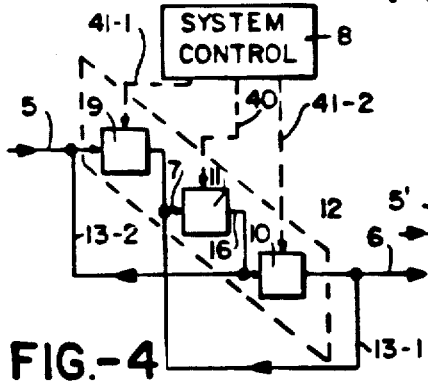
FIG.—4
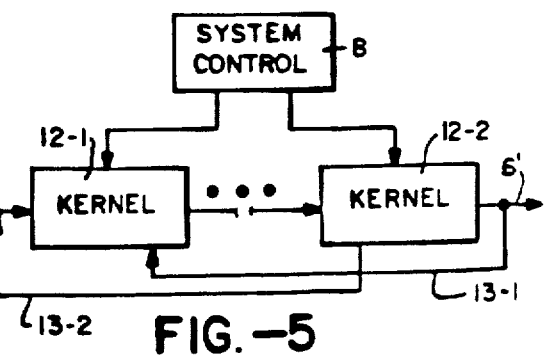
FIG.—5

DATA REORDERING MEMORY FOR USE IN PRIME FACTOR TRANSFORM

This is a division of application Ser. No. 706,222, filed Feb. 27, 1985, which is a continuation-in-part of application Ser. No. 310,469, filed Oct. 13, 1981, now abandoned.

BACKGROUND OF THE INVENTION

This invention relates generally to the field of digital data processing apparatus and more specifically to a computer for performing a discrete Fourier transform on complex input data.

The Fourier transform has been well known to mathematicians, scientists, engineers and others for many years. The Fourier transform is a tool used in many fields such as medicine, economics, and engineering to analyze data.

For example, when the input data represents time-varying electrical signals, the Fourier transform is often performed to identify the frequency components within the electrical signals. Similarly, an inverse Fourier transform is often performed to produce a time-varying electrical signal from frequency components.

In digital data processing apparatus, the Fourier transform is normally performed with discrete values of input data in accordance with the well-known discrete Fourier transform (DFT) defined as follows:

$$X(k) = \sum_{n=0}^{N-1} x(n)e^{j(2\pi/N)nk}$$

The inverse Fourier transform is performed by substituting "−j" for "j" in the discrete Fourier transform. In the DFT transform, N values of the input data x(n) [where n is equal to 0, 1, ..., (N−1)] are transformed to produce N values of output data X(k), where k is equal to 0, 1, ..., (N−1). The number N of values of input data may vary, but the larger the value of N the greater the resolution of the output data. Transforms in accordance with the above equation are called N-point or N-length DFT's. In order to practically and efficiently perform N-length DFT's, digital computers are required. Even using digital computers, however, performance of N-length DFT's is still a formidable task. For this reason, many prior art techniques have been developed to more efficiently perform the N-length discrete Fourier transform.

One significant technique for improving the efficiency of performing the discrete Fourier transform is described in the article by J. W. Cooley and J. W. Tukey, "An Algorithm for the Machine Calculation of Complex Fourier Series", *Math of Computation*, Vol. 19, pp. 297-301, April 1965. When the Cooley-Tukey algorithm was utilized on a general purpose computer, a more than fifty times improvement in processing time occurred for a 1024-point DFT. The Cooley-Tukey algorithm is known as the fast Fourier transform (FFT) and is a radix-2 algorithm.

General background information concerning the fast Fourier transform (FFT) and variations thereof are described in the article "What Is The Fast Fourier Transform?", *Proceedings of the IEEE*, Vol. 55, No. 10, October 1967, Cochran et. al., pp. 1664-1674. The FFT method of computing the N-length DFT relies upon selecting the transform length N as a power of 2. The calculations are grouped in pairs to achieve a significant reduction in the calculation time required for the N-length DFT.

Many other algorithms have since been proposed for more efficiently performing the N-length DFT. A number of such algorithms, including the nested Winograd algorithm, are described and compared in the article "A Prime Factor FFT Algorithm Using A High-Speed Convolution" by Kolba and Parks, *IEEE Transactions on Acoustics Speech and Signal Processing*, Vol. ASSP-25, No. 4, August 1977, pp 281-294. In the prime factor FFT by Kolba and Parks, the transform length N is selected equal to the product of a number of mutually prime factors $N_1, N_2, \ldots, N_i, \ldots, N_L$. Each of the prime factors $N_i$ of N is employed in an $N_i$-length DFT using convolution. In the Kolba and Parks prime factor FFT, L different and shorter-length DFT's are executed in order to achieve the N-point DFT. The Kolba and Parks prime factor FFT compares favorably with the radix-2 algorithm of Cooley-Tukey and the nested algorithm of Winograd.

While various techniques, such as those described above, have significantly improved the efficiency of performing the N-length discrete Fourier transform (DFT), even greater increases in efficiency are desirable. With this objective, special purpose computers, as distinguished from general purpose computers, have been constructed for calculating the N-length DFT. Such special purpose computers have designs which are determined to a large extent by the particular algorithm upon which they are based. In general, it is desirable that such special purpose DFT computers have a high degree of modularity. Modularity tends to reduce the manufacturing and maintenance cost of the computer. Another objective of a special DFT computer is to utilize a small number of circuits again for the purpose of reducing manufacturing and maintenance costs. Another objective is to have a high execution speed. Additionally, flexibility of design is desirable so that the number of data values (N) in the transform and other parameters can be changed.

While the radix-2 FFT of Cooley-Tukey is capable of high modularity when employed in a special purpose computer, the number of circuits required is excessive and the speed of execution is not as high as desirable. While the speed of the prime factor FFT of Kolba and Parks, when implemented in a special purpose computer, is potentially greater than that of the Winograd transform or the radix-2 transform, the Kolba and Parks algorithm generally has not been susceptible of high modularity since each shorter-length prime factor DFT is of a different size. Other prior art transform techniques have similar deficiencies.

In view of the above background of the invention, there is a need for economical special purpose computers and methods for more efficiently performing N-point discrete Fourier transforms and particularly for computers which are modular and flexible in design.

SUMMARY OF THE INVENTION

The present invention is a special purpose computer and method of computation for performing an N-length discrete Fourier transform (DFT) using a sum and difference conjugate prime factor transform. The transform length N is selected as equal to the product of L mutually prime factors $N_1, N_2, \ldots, N_i, \ldots, N_L$ where i is equal to 1, 2, ..., L. For each one of the L mutually prime factors $N_i$, an $N_i$-length DFT is performed. Each $N_i$-length DFT transform is performed using a data processing element called a kernel.

Each kernel includes one or more memory elements for reordering data and a computational element. The memory elements store N values of input data and N values of output data. The computational element performs an $N_i$-length DFT. The N values of input data are designated by the input index, n, which has the values 0, 1, ..., (N−1). In accordance with the present invention, the N values of input data x(n) for each $N_i$-length DFT are processed in groups of n, each group including $N_i$ values of n, which are defined by a new index $n_i$ in accordance with the Chinese remainder theorem.

The computational element includes adder circuit means for forming the sum term, $SUM(n_i)$ equal to the quantity $x(n_i) + x(N_i - n_i)$ and the difference term, $DIFF(n_i)$ equal to $x(n_i) - x(N_i - n_i)$.

The computational element also includes multiplier means for forming the product of the term $SUM(n_i)$ and the term cos $(2\pi n_i k_i / N_i)$. Further, the computational element includes means for forming the product of the term $DIFF(n_i)$ and the term sin $(2\pi n_i k_i / N_i)$. For both products $k_i$ is equal to 0, 1, ..., $(N_i - 1)$.

The computational element additionally includes adder means for accumulating the sum of the products over all values of $N_i$ for $N_i = 1, ..., M$ where M is defined to equal $(N_i - 1)/2$. The term $x(n_i)$ for values of $n_i$ equal to 0 is added to the sum of the accumulated products whereby N values of output data, $X(k_i)$ are formed for an $N_i$-length DFT as follows:

$$X(k_i) = \left[ x(n_i)|_{n_i=0} + \sum_{n_i=1}^{M} (SUM(n_i))\cos(2\pi n_i k_i / N_i) \right] +$$
$$j\left[ \sum_{n_i=1}^{M} (DIFF(n_i))\sin(2\pi n_i k_i / N_i) \right]$$

In order to perform the above $N_i$-length DFT, $k_i$ has values 0, 1, ..., $(N_i - 1)$ determined as the modulus $N_i$ groups of values over all the N index values of n. Accordingly, there are N output values $X(k_i)$ organized in $N/N_i$-length groups, where each group has $N_i$ values.

For the N-length DFT, the above steps are repeated L times, once for each mutually prime factor. For the N-length DFT, the $X(k_i)$ output values from the $N_1$-length DFT are employed as the input values for the $N_2$-length DFT. Similarly, the output values from the $N_2$-length DFT are in turn employed as the input values for the $N_3$-length DFT. Each $N_i$-length DFT output is the $N_{(i+1)}$-DFT input.

This output to input connection continues until all L ones of the $N_i$-length DFT's have been processed. After all of the $N_i$-length DFT's have been processed, the N output values of $X(k_i)$ from the $N_L$-length DFT constitute the output values of the N-length DFT.

The sum and difference conjugate prime factor transform of the present invention achieves an efficient calculation of an N-length DFT. Also, the data processing kernel employed is highly modular and is useful in both pipeline and recursive implementations. Additionally, each kernel operates in a modular way by forming the $SUM(n_i)$ and the $DIFF(n_i)$ conjugate prime factor transforms. Even though each of the $N_i$ are mutually prime, and therefore are of different lengths, the basic structure is modular and is repeated for each of the L different values of $N_i$.

The present invention achieves the objective of providing an efficient performance of an N-length DFT in an economical manner with circuitry which is both flexible and modular.

Additional objects and features of the invention will appear from the following description in which the preferred embodiments of the invention have been set forth in detail in conjunction with the drawings.

BRIEF DESCRIPTION OF THE DRAWINGS

FIG. 1 depicts an general block diagram with a sum and difference conjugate prime factor transform computer positioned to transform the input data from the data source to provide the transformed data to a data sink.

FIG. 2 depicts a single kernel which is a building block utilized to construct the sum and difference conjugate prime factor transform computer of FIG. 1.

FIG. 3 depicts a block diagram of a N-stage pipeline embodiment of the transform computer of FIG. 1.

FIG. 4 depicts a single-kernel, recursive sum and difference conjugate prime factor transform computer.

FIG. 5 depicts a block diagram of a combination of a partially recursive and partially pipeline transform computer in accordance with the present invention.

DETAILED DESCRIPTION

Overall Description—FIG. 1

Figure 6:
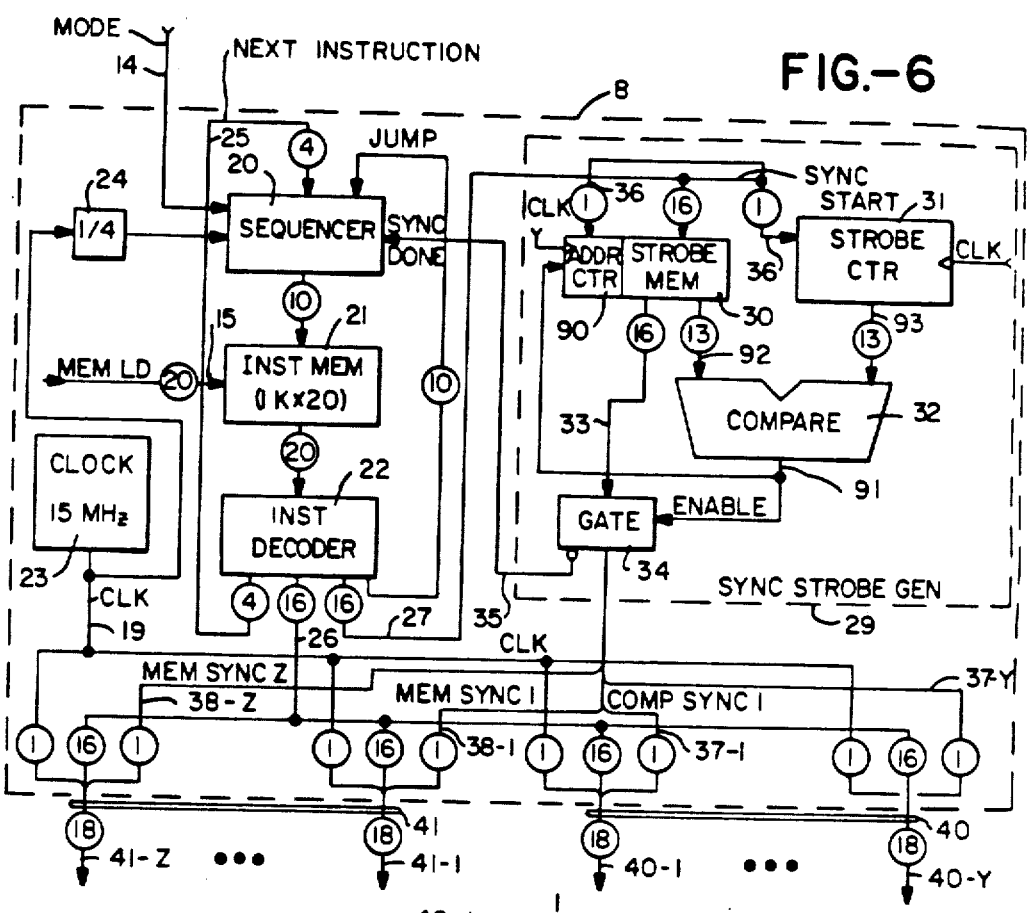
FIG. 6 depicts an electrical block diagram of a system control utilized in connection with any of the FIGS. 3, 4 and 5 embodiments of the present invention.

In FIG. 1, a data source 2 stores data which is to be transformed by an N-length discrete Fourier transform. The data source 2 typically includes a digital computer, a computer memory or other device for providing discrete data samples. For an N-length DFT, data source 2 provides the input data as data samples x(n) in groups of N input data values at a time, that is, N is equal to 0, 1, ..., (N−1). The values of x(n) represent, for example, samples proportional to the amplitude of radar or other electrical signals to be analyzed. Typically, such samples are periodically obtained from an electrical signal. In one embodiment, the sampling rate is 15 MHz. Such samples are typically complex numbers having both a real part and an imaginary part.

The input data x(n) from the data source 2 is transmitted over bus 5 to computer 3. In computer 3, the input data is processed, in accordance with the present invention, by a sum and difference conjugate prime factor transform. For each N values of input data x(n), the transform computer 3 performs an N-length DFT which in turn yields N values of output data X(k) on bus 6. The output data is typically transmitted over bus 6 to a data sink 4. Data sink 4 is typically a storage device, a display device or other device for utilization of the transformed data. When the input data is sampled values of radar or other electrical signals, the data sink 4 typically includes a display device for displaying the frequency components of the electrical signal.

The operation of the sum and difference conjugate prime factor transform computer 3 of the present invention is explained with reference to a mathematical derivation of the sum and difference conjugate prime factor transform.

Mathematical Derivation

The N-length discrete Fourier transform (DFT) is defined as follows:

$$X(k) = \sum_{n=0}^{N-1} x(n) e^{j(2\pi/N)nk} \qquad \text{Eq. (1)}$$

where, $k = 0, 1, 2, \ldots, (N-1)$

The index n of the input sequence x(n) in Eq.(1) is called the input index. Similarly, the index k of the output sequence X(k) is called the output index. In Eq.(1) both the input index n and the output index k are one dimensional. For N input values of n, N output values of k are produced and Eq.(1) is, therefore defined to be one dimensional.

For purposes of the present invention, Eq.(1) is modified by factoring N into the L factors $[N_1][N_2] \ldots [N_{(i-1)}][N_i] \ldots [N_L]$ where each of the factors $N_i$ are mutually prime and the transform is rewritten as an "L-dimensional" transform.

The L-dimensional transform is achieved by rewriting Eq.(1) using modular indexing techniques. The first indexing technique represents the input index n by L sets of indices $n_1, n_2, \ldots, n_L$ such that, $$n = (n_1 R_1 + n_2 R_2 + n_3 R_3 + \ldots + n_i R_i \ldots + n_L R_L) \bmod N \qquad \text{Eq.(2)}$$

where, $i = 1, 2, \ldots, L$

In Eq.(2), each value of $R_i$ is selected to have a value such that $$R_i \bmod N_m = \begin{Bmatrix} 1 \text{ for } i = m \\ 0 \text{ for } i \neq m \end{Bmatrix} \qquad \text{Eq. (3)}$$

where $i = 1, 2, \ldots, L$
$m = 1, 2, \ldots, L$

Therefore, $n_i$ in Eq.(2) is given for each value of n as follows:

$$n_i = n \bmod N_i \qquad \text{Eq.(4)}$$

so that, $n_1 = 0, 1, \ldots, (N_1 - 1)$
$n_2 = 0, 1, \ldots, (N_2 - 1)$
.
.
$n_i = 0, 1, \ldots, (N_i - 1)$
.
.
$n_L = 0, 1, \ldots, (N_L - 1)$ The Eqs.(2), (3) and (4) define the "Chinese remainder theorem."

The second indexing technique represents the output index k, as used in Eq.(1), by L sets of indices $k_1, k_2, \ldots, k_L$ such that, $$k = [(k_1)(N/N_1) + (k_2)(N/N_2) + \ldots + (k_i)(N/N_i) + (k_L)(N/N_L)] \bmod N \qquad \text{Eq.5}$$

where, $k_i = 0, 1, \ldots, (N_i - 1)$
$i = 1, 2, \ldots, L$

Note that $k_i \neq k \bmod N$ in Eq.(5) and that, $k_1 = 0, 1, \ldots, (N_1 - 1)$
$k_2 = 0, 1, \ldots, (N_2 - 1)$
.
.
$k_L = 0, 1, \ldots, (N_L - 1)$ The indexes $n_i$ and $k_i$ are used to define the two new L-dimensional arrays:

$$\overline{x}(n_1, n_2, \ldots, n_i, \ldots, n_L) = x(n_1 R_1 + n_2 R_2 + n_i R_i + \ldots + n_L R_L) \bmod N \qquad \text{Eq.(6)}$$

$$\overline{X}(k_1, k_2, \ldots, k_i, \ldots, k_L) = X[k_1(N/N_1) + k_2(N/N_2) + \ldots + (k_i)(N/N_i) + \ldots + k_L(N/N_L)] \bmod N \qquad \text{Eq.(7)}$$

Eqs.(6) and (7) are substituted into Eq.(1), where $X(k) = \overline{X}(k_1, \ldots, k_L)$, as follows:

$$\overline{X}(k_1, \ldots, k_L) = \sum_{n_1=0}^{N_1-1} \ldots \sum_{n_L=0}^{N_L-1} \overline{x}(n_1, \ldots, n_L) \qquad \text{Eq. (8)}$$

$$\exp\left[ j(2\pi/N) \sum_{m=1}^{L} k_m (N/N_m) \sum_{i=1}^{L} n_i R_i \right]$$

The exponential term in Eq.(8) is simplified as follows:

$$\exp j(2\pi/N)(N/N_m) = \exp j(2\pi/N_m) \qquad \text{Eq.(9)}$$

Using Eq.(9), Eq.(8) is reduced as follows:

$$\overline{X}(k_1, \ldots, k_i, \ldots, k_L) = \sum_{n_1=0}^{N_1-1} \ldots \sum_{n_L=0}^{N_L-1} \overline{x}(n_1, \ldots, n_i, \ldots, n_L) \qquad \text{Eq. (10)}$$

$$\prod_{m=1}^{L} \exp[j(2\pi/N_m) R_i n_i k_m]$$

Eq.(10) is further reduced as follows:

$$\overline{X}(k_1, \ldots, k_L) = \sum_{n_1=0}^{N_1-1} \ldots \sum_{n_L=0}^{N_L-1} \overline{x}(n_1, \ldots, n_L) \prod_{m=1}^{L} \qquad \text{Eq. (11)}$$

-continued $$\prod_{i=1}^{L} \exp[j(2\pi/N_m)R_i n_i k_m]$$

However, as in Eq.(3), the exponential term in Eq.(11) is given as follows:

$$\exp[j(2\pi/N_m)R_i] = \begin{cases} \exp j(2\pi/N_i) & \text{for } i = m \\ 1 & \text{for } i \neq m \end{cases} \quad \text{Eq. (12)}$$

Using Eq.(12) in Eq.(11) yields the following:

$$\bar{X}(k_1, k_2, \ldots, k_L) = \quad \text{Eq. (13)}$$

$$\left[ \sum_{n_L=0}^{N_L-1} \cdots \left( \sum_{n_2=0}^{N_2-1} \left( \sum_{n_1=0}^{N_1-1} \bar{x}(n_1, n_2, \ldots, n_L) e^{j(2\pi/N_1)n_1 k_1} \right) e^{j(2\pi/N_2)n_2 k_2} \right) \cdots e^{j(2\pi/N_L)n_L k_L} \right]$$

Eq.(13) defines a prime factor transform (PFT) which is particularly useful as a starting point for the present invention. Eq.(13) is essentially an L-dimensional DFT where a number L of $N_i$-length DFT's (i=1, 2, ..., L) are excecuted instead of one N-length DFT. The execution of Eq.(13) for each of L DFT's consists of reordering the input data according to Eq.(2), performing an $N_i$-length DFT and reodering the output data according to Eq.(5).

Eq.(13) requires the computation of L different $N_i$-length DFT's (i=1, 2, ..., L) where each value of $N_i$ is mutually prime to all of the other values of $N_i$. Eq.(13) implies that $N_i$ has odd number lengths, with not more than one even number length, if any. Typically, odd number lengths for $N_i$ are 3, 5, 7, 9, 11 and 13.

Special DFT equations, which can be implemented with digital circuitry, have been derived for odd values of $N_i$. For those $N_i$ which are odd and letting $M=(N_i-1)/2$, the basic DFT equation, Eq.(1), may be written for an $N_i$-length DFT as follows:

$$X(k_i) = x(n_i)|_{n_i=0} + \sum_{n_i=1}^{M} [x(n_i)e^{j(2\pi/N_i)n_i k_i} + \quad \text{Eq. (14)}$$

$$x(N_i - n_i)e^{j(2\pi/N_i)(N_i-n_i)k_i}]$$

$$X(k_i) = x(n_i)|_{n_i=0} + \sum_{n_i=1}^{M} [(x(n_i) + x(N_i - n_i))\cos(2\pi/N_i)n_i k_i + \quad \text{Eq. (15)}$$

$$j \sum_{n_i=1}^{M} [(x(n_i) - x(N_i - n_i))\sin(2\pi/N_i)n_i k_i]$$

In connection with Eq.(15) the terms $SUM(n_i)$ and $DIFF(n_i)$ are defined to equal the following terms:

$$SUM(n_i) = x(n_i) + x(N_i - n_i) \quad \text{Eq.(16)}$$

$$DIFF(n_i) = x(n_i) - x(N_i - n_i) \quad \text{Eq.(17)}$$

Using Eqs.(16) and (17) in Eq.(15) yields, $$X(k_i) = \left[ x(n_i)|_{n_i=0} + \sum_{n_i=1}^{M} (SUM(n_i))\cos(2\pi n_i k_i/N_i) \right] + \quad \text{Eq. (18)}$$

$$j \left[ \sum_{n_i=1}^{M} (DIFF(n_i))\sin(2\pi n_i k_i/N_i) \right]$$

where, $$k_i = 0, 1, \ldots, (N_i - 1)$$

Eq.(18) is in the basic form of the sum and difference conjugate prime factor transform in accordance with the present invention. In order to calculate a full N-point DFT, Eq.(18) must be evaluated L times, once for each of the prime factors of N. In order to reduce the number of calculations of Eq.(18) for each prime factor, three different forms of Eq.(18) are employed in one preferred embodiment of the present invention. The three forms are obtained by letting $k_i$ equal 0, $k_j$, and $(N_i - k_i)$ in Eq.(18) as follows:

$$X(k_i)|_{k_i=0} = x(n_i)|_{n_i=0} + \sum_{n_i=1}^{M} SUM(n_i) \quad \text{Eq. (19)}$$

$$X(k_i) = x(n_i)|_{n_i=0} + \sum_{n_i=1}^{M} (SUM(n_i))\cos(2\pi n_i k_i/N_i) + \quad \text{Eq. (20)}$$

$$j \left[ \sum_{n_i=1}^{M} (DIFF(n_i))\sin(2\pi n_i k_i/N_i) \right]$$

$$X(N_i - k_i) = \left[ x(n_i)|_{n_i=0} + \sum_{n_i=1}^{M} (SUM(n_i))\cos(2\pi n_i k_i/N_i) \right] - \quad \text{Eq. (21)}$$

$$j \left[ \sum_{n_i=1}^{M} (DIFF(n_i))\sin(2\pi n_i k_i/N_i) \right]$$

where for Eqs.(19), (20), and (21), $$M = (N_i - 1)/2$$

and where for Eqs.(20) and (21), $$k_i = 1, \ldots, M$$

The equations for an inverse DFT are identical to Eqs.(1) through (21) above when "j" is replaced by "−j" in Eqs.(1), (8) through (15), and (18) through (21).

Processing Single $N_i$-length DFT

For each $N_i$-length DFT, Eq.(18) or Eqs.(19), (20) and (21) are evaluated for each value of n and for the corresponding value of $n_i$ of Eq.(4). There are $N/N_i$ groups of values of $n_i$ for the N values of n of Eq.(4). In order to uniquely identify the different values of $n_i$ in connection with Eqs.(18), (19), (20) and (21), the index $f_i$ is employed as follows:

$$f_i = n_i + (g_i)(N_i) \quad \text{Eq.(22)}$$

where, $n_i = 0, 1, \ldots, (N_i-1)$
$g_i = 0, 1, \ldots, (N/N_i-1)$
$f_i = 0, 1, \ldots, (N-1)$ It is apparent from Eq.(22) that, $$n_i = f_i \bmod N_i = F_i \qquad \text{Eq.(23)}$$

Similarly, to uniquely identify the different values of $k_i$ in connection with Eqs. (18), (19), (20) and (21), the index $p_i$ is employed as follows:

$$p_i = k_i + (g_i)(N_i) \qquad \text{Eq.(24)}$$

where $k_i = 0, 1, \ldots, (N_i-1)$
$g_i = 0, 1, \ldots, (N/N_i-1)$
$p_i = 0, 1, \ldots, (N-1)$ It is apparent from Eq.(24) that $$k_i = i_i \bmod N_i = P_i \qquad \text{Eq.(25)}$$

For convenience, certain of the values of $n_i$ and $k_i$ given by Eqs.(23) and (25) are substituted into Eq.(16) through Eq.(21). With such a substitution, Eq.(16) and Eq.(17) become Eq.(26) and Eq.(27) as follows:

$$SUM(F_i,f_i) = x_i(F_i,f_i) + x_i(N_i-F_i,f_i) \qquad \text{Eq.(26)}$$

$$DIFF(F_i,f_i) = x_i(F_i,f_i) - x_i(N_i-F_i,f_i) \qquad \text{Eq.(27)}$$

Similarly, Eqs.(19), (20) and (21) become Eqs.(28), (29) and (30) as follows:

$$X_i(P_i, p_i)|_{P_i=0} = x_i(F_i, f_i)|_{F_i=0} + \sum_{F_i=0}^{M} SUM(F_i, f_i) \qquad \text{Eq.(28)}$$

$$X_i(P_i, p_i)|_{P_i=k_i} = x_i(F_i, f_i)|_{F_i=0} + \qquad \text{Eq.(29)}$$

$$\sum_{F_i=1}^{M} SUM(F_i, f_i)\cos(2\pi F_i k_i/N_i) +$$

$$j\left[\sum_{F_i=1}^{M} (DIFF(F_i, f_i))\sin(2\pi F_i k_i/N_i)\right]$$

$$X_i(P_i, p_i)|_{P_i=(N_i-k_i)} = x_i(F_i, f_i)|_{F_i=0} + \qquad \text{Eq.(30)}$$

$$\sum_{F_i=1}^{M} (SUM(F_i,f_i))\cos(2\pi F_i k_i/N_i) -$$

$$j\left[\sum_{F_i=1}^{M} (DIFF(F_i, f_i))\sin(2\pi F_i k_i/N_i)\right]$$

where for Eqs.(29) and (30) $k_i$ is equal to 1, 2, ..., M.

Eqs.(28), (29) and (30) are each evaluated $N/N_i$ times for each $N_i$-length DFT. For each $N_i$-length DFT, the input data has the order established by the input index $n$ where $n = 0, 1, \ldots, N-1$. For each $N_i$-length DFT, the input data ordered by $n$ is reordered by the Chinese remainder theorem to provide the reordered input data, $x_i(F_i,f_i)$, as follows:

$$x_i(F_i,f_i) = x_i(0,0),x_i(1,1),\ldots,x_i(N_1-1,N_i-1), \qquad \text{Eq.(31)}$$
$$x_i(0,N_i),x_i(1,N_i+1),\ldots,x_i(N_i-1,2N_i-1)$$
$$x_i(0,N-N_i),\ldots,x_i(N_i-1,N-1)$$

The reordered input data of Eq.(31) is processed by Eqs.(28), (29) and (30) to produce the output data, $X_i(P_i,p_i)$ as follows:

$$X_i(P_i,p_i) = X_i(0,0),X_i(1,1),\ldots,X_i(N_i-1,N_i-1), \qquad \text{Eq.(32)}$$
$$X_i(0,N_i),X_i(1,N_i+1),\ldots,X_i(N_i-1,2N_i-1),$$

$$X_i(0,N-N_i),\ldots,X_i(N_i-1,N-1)$$

The output data of Eq.(32) for an $N_i$-length DFT is ordered in $p_i$ for $p_i = 0, 1, \ldots, (N-1)$. At the same time, the output data of Eq.(32) is ordered in $k_i$ where $k_i$ is related to $p_i$ by Eq.(25).

Using Eq.(25) with Eq.(5), the processed data $X_i(P_i,p_i)$ of Eq.(32) is reordered in the output index k to form the output data $X_i(k)$ where $k = 0, 1, \ldots, (N-1)$.

Processing L Successive $N_i$-length DFT's

In order to perform an N-length DFT, L successive $N_i$-length DFT's are processed, each using Eqs.(28), (29) and (30), where L is the number of mutually prime factors of N given by $[N_1][N_2] \ldots [N_{i-1}][N_i] \ldots [N_L]$ and where $i = 1, 2, \ldots, L$.

For the first prime factor DFT, that is the $N_1$-length DFT, the input data $x_1(n)$ is the N values of $x(n)$ of Eq.(1) ordered by $n = 0, 1, \ldots, (N-1)$, that is, $x_1(n)$ is identical to $x(n)$.

The $x(n)$ input data is recorded by the Chinese remainder theorem to provide the reordered input data $x_i(F_i,f_i)$ given by Eq.(31) when $i=1$. The $x_1(F_1,f_1)$ input data is processed by Eqs.(28), (29) and (30) to form the output data $X_1(P_1,p_1)$ given by Eq.(32) when $i=1$. The $X_1(P_1,p_1)$ output data is reordered using Eq.(5) to provide the reordered output data $X_1(k)$ where $k = 0, 1, \ldots, (N-1)$. Formation of the $X_1(k)$ values reorders the output data in accordance with the original index and thereby completes the processing for the $N_1$-length DFT.

For the $N_2$-length DFT, the $X_1(k)$ data from the $N_1$-length DFT is the input data $x_2(n)$, that is, $x_2(n)$ is identical to $X_1(k)$. The $x_2(n)$ input data is reordered to form the reordered input data $x_2(F_2,f_2)$. Eqs.(28), (29) and (30) are iterated $N/N_2$ times using the data $x_2(F_2,f_2)$ to form the output data $X_2(P_2,p_2)$.

The output data $X_2(P_2,p_2)$ is reordered to form the output data $X_2(k)$ thereby completing the processing of the $N_2$-length DFT.

For the $N_3$-length DFT, the input data $x_3(n)$ is the $N_2$-length output data $X_2(k)$, that is, $x_3(n)$ is identical to $X_2(k)$. The $N_3$-length DFT processing forms the $X_3(P_3,p_3)$ output data which is reordered to the $X_3(k)$ output data.

Each successive $N_i$-length DFT uses the output data indexed in k of the $N_{(i-1)}$-length DFT as the input data $x_i(n)$. Alternatively stated, the $N_i$-length DFT output data is the $N_{(i+1)}$-length DFT input data. Finally, the $N_L$-length DFT produces the output data, $X_L(k)$. The $X_L(k)$ output data is the desired N-length DFT, that is, for Eq.(1), $X(k)$ is identical to $X_L(k)$.

Kernel—FIG. 2

In FIG. 2, the kernel 12 depicts the basic building block used to construct the sum and difference conjugate prime factor transform computer 3 of FIG. 1. The kernel receives the input data on the bus 5' and provides the output data on the bus 6'. The input bus 5' and the output bus 6' correspond in certain embodiments to the input bus 5 and the output bus 6, respectively, in FIG. 1.

In the kernel 12, an input memory element 9 is connected to the input bus 5' and connects its output bus 7 as an input to the computational element 11. Also, an output memory element 10 receives the output bus 16 from the computational element 11 and provides the output data bus 6'. The memory elements 9 and 10 receive the control buses 41-1 and 41-2 as inputs, respectively, and the computational element 11 receives control bus 40 as an input.

In FIG. 2, the memory element 9 receives, over input bus 5', the ordered input data x(n) defined in accordance with Eq.(1). There are N values of x(n) which are stored sequentially in memory 9 in the order of the index n. The memory element 9 functions as a first reorder means to reorder the input data in accordance with the Chinese remainder theorem to provide the reordered input data $x_i(F_i,f_i)$ in accordance with Eq.(31). The reordered data appears on the bus 7 as an input to the computational element 11. The computational element 11 processes an $N_i$-length DFT to produce the transformed data values $X_i(P_i,p_i)$ on bus 16 in accordance with Eq.(32).

The output data on bus 16 is transferred to the output memory 10. Output memory 10 functions as a second reorder means to reorder the transformed data on bus 16 to form the reordered output data $X_i(k)$ thereby completing an $N_i$-length DFT. Accordingly, the FIG. 2 kernel performs a sum and difference conjugate prime factor transform which is an $N_i$-length DFT.

The manner in which one or more kernels, like kernel 12 of FIG. 2, are interconnected to form a transform computer in accordance with the present invention is explained in connection with the embodiments of FIGS. 3, 4 and 5.

Pipeline Computer—FIG. 3

In FIG. 3, a pipeline sum and difference conjugate prime factor transform computer is shown. The computer includes a plurality of kernels 12-1, 12-2, 12-3, . . ., 12-L like kernel 12 of FIG. 2. The input to the first kernel 12-1 is the input bus 5 and the output from the last kernel 12-L is the output bus 6. Each of the kernels of FIG. 3 receives control inputs from the system control 8. In the embodiment of FIG. 3, an additional input memory element 10-0 and an additional output memory element 9-(L+1) are provided. Both additional memory elements receive a control bus input from the system control 8. With these two additional memory elements, each computational element 11-1, 11-2, . . . , 11-L is associated with both a pair of input memory elements and a pair of output memory elements.

In FIG. 3, each of the kernels 12-1 through 12-L is constructed and controlled to perform an $N_i$-length DFT. Specifically, the kernel 12-1 does a $N_1$-length DFT, kernel 12-2 does a $N_2$-length DFT, kernel 12-3 does a $N_3$-length DFT and so on until the kernel 12-L does a $N_L$-length DFT. The overall computer of FIG. 3 performs an N-length DFT where N is a product of the mutually prime factors $N_1, N_2, N_3, \ldots, N_L$.

In one preferred embodiment of the present invention, L is equal to 4, $N_1$ is equal to 5, $N_2$ is equal to 7, $N_3$ is equal to 9, and $N_4$ is equal to 13. The product of these four mutually prime factors is 4095, the value of N. Accordingly, with these values, the sum and difference conjugate prime factor transform computer of FIG. 3 is a 4095-length DFT computer.

In FIG. 3, each of the kernels 12-1 through 12-L are comprised of memory elements and computational elements identicaal to those of FIG. 2 and are identified with the same reference numeral together with a postscript corresponding to the postscript of the kernel, that is the postscripts 1, 2, . . . , L. Accordingly, the input memory element 9-1 in the kernel 12-1 of FIG. 3 corresponds to the memory element 9 of FIG. 2. Also, in FIG. 3, the additional memory element 10-0 is also connected to receive the input bus 5. The output from each of the memory elements 9-1 and 10-0 connects as inputs to the computational element 11-1. Each of the memory elements 10-0 and 9-1 receive a memory control bus, like control buses 41-1 and 41-2 of FIG. 2, as an input.

In operation, the memories 9-1 and 10-0 alternate in function. During a first period, a first set of N values of input data ordered by the index n are provided on input bus 5 and are loaded into a first one of the memories such as memory 9-1. During a second period, the memory 9-1 functions as a first reorder means and reorders the first set of data values in accordance with the Chinese remainder theorem and transmits that first set of reordered data to the computational element 11-1. While the memory 9-1 is reordering the first set of data values received during the first period, the input bus 5 is active loading a second set of N values of input data into the input memory 10-0. During a third period of operation, the memory 10-0 functions as a first reorder means and reorders the second set of input data values in accordance with the Chinese remainder theorem and transfers the reordered second set of input data values as inputs to the computational element 11-1. During the third period of operation, the input bus 5 loads a third set of N values of input data into the memory 9-1. In this way, the memories 9-1 and 10-0 alternate the loading and reordering functions. During each of the periods after the initial period, the computational element 11-1 performs an $N_1$-length DFT on the reordered input data values alternately from memories 9-1 and 10-0.

During the second period when the computational element 11-1 is processing the reordered data from the memory element 9-1, the memory element 10-1 is storing the processed data. In storing the processed data from the computational element 11-1, the memory element 10-1 functions as a second reorder means and reorders the data prior to storage.

During the third period of operation, data from the memory element 10-0 is reordered in accordance with the Chinese remainder theorem, is processed by the computational element 11-1, and the processed data is reordered by the memory element 9-2 and stored. At this time, the memory element 10-0 functions as the first reorder means and the memory element 9-2 functions as the second reorder means.

Also during the third period, the data stored in the memory element 6-1 is reordered in accordance with the Chinese remainder theorem, processed by the computational element 11-2, again reordered and stored in the memory element 9-3.

In a similar manner, during the fourth period, data from the memory element 9-3 is reordered, processed by the computational element 11-3, again reordered and stored in the memory element 10-3.

For each new period, new data is introduced from bus 5 during the odd periods to the memory element 9-1 and during the even periods to the memory element 10-0. With input data continuously introduced into the pipeline system of FIG. 3, data is processed from the memory elements 9-1, 9-2, . . . , 9-L through the respective computational elements 11-1, 11-2, . . . , 11-L to the memory elements 10-1, 10-2, . . . , 10-L, respectively. Similarly, during each of the odd periods, data is transferred from the memory elements 10-0, 10-1, . . . , 10-L through the computational elements 11-1, 11-2, . . . , 11-L, respectively, to the memory elements 9-2, 9-3, . . . , 9-(L+1), respectively. With this alternating operation, the pairs of memory elements, such as memory elements 10-1 and 9-2 alternately serve as output memory elements (second reorder means) and input memory elements (first reorder means).

The functions of the memory elements as either an input reorder element or an output reorder element are substantially the same. When a memory element is serving as an input element to the computational element, then the memory element functions to reorder the data in accordance with the Chinese remainder theorem. When a memory element functions as an output element, then the memory functions to reorder the data back to the original index n order, in the manner previously explained in connection with Eq.(5). In both cases, that is for input and output operations, the reordering is implemented with a modular $N_i$ addressing apparatus.

The sum and difference conjugate prime factor pipeline computer of FIG. 3 continuously processes N-values of input data to perform an N-length DFT during each one of successive periods. In one preferred embodiment of the present invention, the input data values on the bus 15 occur at a 15 MHz rate. In an embodiment where a 4095-length DFT is performed, the pipeline computer of FIG. 3 performs at the rate of approximately one 4095-length transform each 273 microsecond period.

Recursive Computer—FIG. 4

In FIG. 4, a recursive embodiment of the present invention is shown. Only a single kernel 12 is employed. The input bus 5 and the output bus 6 from the kernel 12 are the same as the buses 5 and 6 in FIG. 1 and 5' and 6' in FIG. 2. Additionally, the output bus 6 is connected via bus 13-1 to the computational element input bus 7. The bus 13-1 enables the output from the memory 10 of kernel 12 to be connected as the input to the computational element so that the output can be reused in successive operations of the kernel 12. Similarly, the bus 13-2 connects the computational element output bus 16 as an input to the memory element 9. With these connections, memory elements 9 and 10 alternate between supplying inputs to and receiving outputs from the computational element 11.

When the computer of FIG. 4 performs a 4095-length DFT, then the kernel 12 is operated in four successive sequences. Each of the four sequences represents one of the $N_i$-length DFT calculations. For example, the first computation for kernel 12 is a 5-length DFT. Reordered data $X_1(F_1,f_1)$ from memory 9 is supplied over bus 7 as an input to computational element 7. Transformed data $X_1(P_1,p_1)$ on bus 16 is reordered by and stored in memory element 10 as the $X_1(k)$ data. At this time, the roles of the memory elements 9 and 10 are reversed. The $X_1(k)$ data is reordered by memory element 10 as the $x_2(F_2,f_2)$ data input to computational element 11 on bus 13-1. Computational element 7 transforms the data with a 7-length DFT to $X_2(P_2,p_2)$ on bus 13-2 and that transformed data is reordered by memory element 9 and stored as $X_2(k)$. Again the rolls of the memory elements 9 and 10 are reversed. Thereafter a 9-length DFT is performed by kernel 12 followed by a 13-length DFT. In this way, the kernel 12 of FIG. 4 acts recursively to perform different length DFT's in successive time sequences.

While the FIG. 4 recursive computer has significantly less circuitry than the pipeline computer of FIG. 3, the FIG. 4 recursive computer requires approximately four times the amount of time to perform an N-length DFT than is required by the FIG. 3 pipeline computer when analyzed in connection with a continuous stream of input data.

Combined Pipeline and Recursive Computer—FIG. 5

In FIG. 5, a combination of the pipeline computer of FIG. 3 and the recursive computer of FIG. 4 is shown. In FIG. 5 the kernel 12-1 and any number of additional kernels (not specifically shown) including a kernel 12-L are connected in series with recursive feedback buses 13-1 and 13-2. FIG. 5 is connected, in one example, to have the recursive kernel 12-1 perform 13-length and 9-length prime factor transforms and to have the kernel 12-L thereafter perform 7-length and 5-length DFT's. In this example, the FIG. 5 computer performs a 4095-length DFT.

In general, the selection of which one of the FIGS. 3, 4 or 5 computers is to be employed involves a trade-off between the speed of operation and the cost of the circuitry for the computer. The FIG. 3 pipeline computer is the highest speed but also the highest cost. The FIG. 4 fully recursive computer is the least expensive, but the slowest. The FIG. 5 combination recursive and pipeline computer is somewhere between both the FIG. 3 and FIG. 4 computers in both speed of operation and cost.

System Control—FIG. 6

In FIG. 6, a system control 8 suitable for use with any of the computers of FIGS. 3, 4 and 5 is shown. The system control includes a conventional clock 23 which provides an output line 19 a CLK signal. The CLK signal is typically 15 MHz. The CLK signal from clock 23 provides the basic timing for all of the transform computer operations. The CLK signal on line 19 connects as an input to a frequency divider circuit 24. Divider 24 is a conventional circuit for reducing the frequency of the CLK signal by a factor of 4 and can be, for example, a two-stage binary counter. The reduced clock signal from the divider 24 provides the timing signal to a conventional sequencer 20.

Sequencer 20 is, for example, an American Micro Devices sequencer, Model AMD-2910. Sequencer 20 includes a control input on bus 14 for signaling the sequencer 20 to be in different modes of operation including a RUN state. When enabled to run, the sequencer 20 provides a 10-bit instruction address to an instruction memory 21. Sequencer 20, therefore, provides a new instruction address every fourth CLK cycle to the instruction memory 21. Instruction memory 21 is typically a 1K by 20 random access memory (RAM). Instruction memory 21 is pre-loaded through a 20-bit memory load bus 15. The instructions in memory 21 control the computer in a conventional manner. While an instruction decoder is preferred, any other conventional device for generating the control signals hereinafter described may be employed.

Each addressed instruction from memory 21 appears on the 20-bit output bus which connects to the conventional instruction decoder 22. Instruction decoder 22 has a 4-bit output bus 25 which connects as the next-instruction address input to the sequencer 20. Decoder 22 has a 10-bit output bus 28 which connects as an explicit instruction input to the sequencer 20. Whenever the sequencer 20 is to jump to a new instruction address not in the current address sequence, the instruction address is explicitly contained on the bus 28. Decoder 22 includes a 16-bit output bus 27 which connects as an input to the sync strobe generator 29. One of the lines of the 16-bit bus 27 is the SYNC START line 36 which, when enabled, signals the sync strobe generator 29 to commence operation.

Instruction decoder 22 also includes a 16-bit output bus 26 which provides control information to each of the memory and computational elements of the computer of the present invention.

In FIG. 6, the sync strobe generator 29 includes a strobe memory 30 for storing strobe information utilized to generate strobe signals for synchronizing the operation of the various circuits of the present invention. The strobe memory is loaded with the appropriate strobe signals, under control of the sequencer 20 during an initial loading sequence of instructions from memory 21. After the loading sequence is executed, the strobe memory 30 is addressed by the strobe memory address counter 90. The memory address counter 90 addresses the strobe memory 30 to access the next set of strobe signals which then appear on buses 33 and 92. Counter 90 is reset by the SYNC START signal on line 36 and is stepped by each ENABLE signal on line 91. One 13-bit field on bus 92 from the strobe memory 30 is input to a comparator circuit 32. Another input to the comparator circuit 32 is the 13-bit from a strobe counter 31. The strobe counter 31 is clocked by the CLK signal. When the count in counter 31 matches the count in strobe memory 13, an enable signal on line 91 is provided from comparator 32 to an output gate 34 and to the strobe memory address counter 90. The output gate 34 selects the 16-bit output on bus 33 from the strobe memory 30 to be the current strobe signals. In this way, strobe signals are generated from gate 34 for propagation to all the different elements of the computer of the present invention.

Two different types of strobe signals are generated. A first type of strobe signals are the COMP SYNC signals for synchronizing computational elements and these are generated on lines 37-1 through 37-Y from gate 34. The COMP SYNC signals on lines 37-1 through 37-Y are grouped together one at a time with the 16-bit control field on bus 26 and the CLK signal line 19 to form the 18-bit buses 40-1, . . . , 40-Y. The buses 40-1, . . . , 40-Y connect to the circuits in the computational element within each kernel, like kernel 12 of FIG. 2. A second type of strobe signals are the MEM SYNC signals on lines 38-1 through 38-Z from gate 34. The signal line 38-1 is grouped together with the 16-bit bus 26 and the 1-bit CLK signal line to form the 18-bit bus 41-1. Bus 41-1 connects to one of the memory elements, like memory element 9 in FIG. 2. A number of MEM SYNC lines 38-1, . . . , 38-Z are provided, in general, one for each of the memory elements. The lines 38-1, . . . , 38-Z are grouped with bus 26 and CLK line 19 to form the control buses 41-1, . . . , 41-Z, respectively.

The operation of the system control of FIG. 6 is conventional. When the mode bus 14 signifies the RUN state, sequencer 20 initially loads the strobe memory 30 with information previously stored in the instruction memory 21. Also, various other control information as hereafter explained is loaded over the buses 40-1, . . . , 40-Y and 41-1, . . . , 41-Z to the various components of the computer. This control information establishes the appropriate start-up conditions required to carry out the DFT computation. When all the control information has been appropriately loaded, sequencer 20 causes the processing to commence and instruction decoder 22 decodes the SYNC START signal which, on line 36, starts the strobe counter 31 counting.

Whenever the count in counter 31 matches the count in the strobe memory 30, the enable signal to gate 33 gates the sync signals on the appropriate buses 41-1 to 41-Z and 40-1 to 40-Y.

Figure 7:
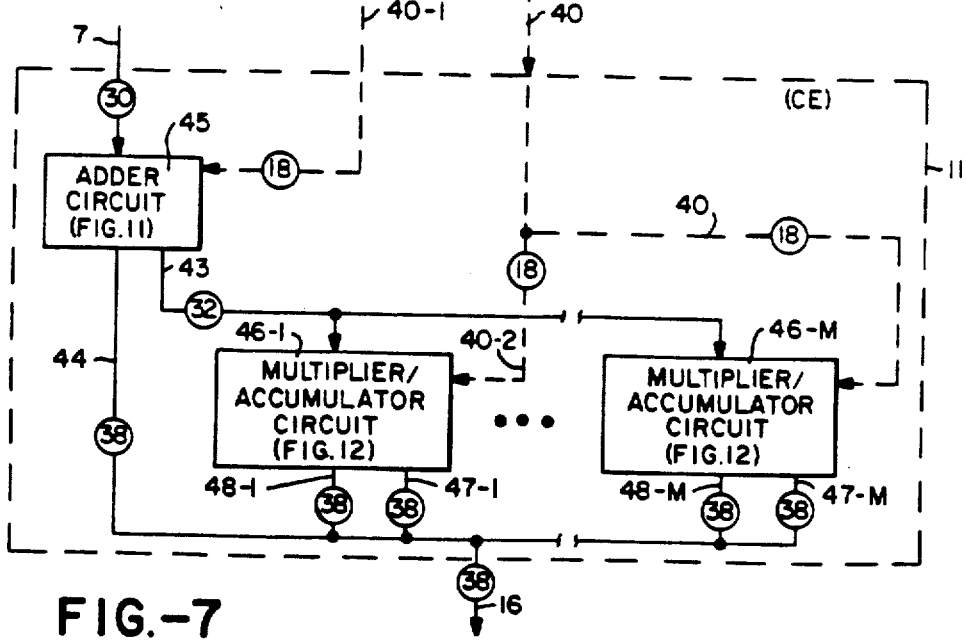
FIG. 7 depicts an electrical block diagram of the computational element (CE) which form a part of the kernel of FIG. 2.

Computational element—FIG. 7

In FIG. 7, the computational element (CE) 11 of FIG. 2 is shown in greater detail. The computational element 11 includes an adder circuit 45. Adder circuit 45 receives the 30-bit data input bus 7 from the memory element 9 of FIG. 2. The 30-bit bus 7 carries one value each CLK cycle of the input data, $x_i(F_i,f_i)$. That one value is typically complex having a 15-bit real portion and a 15-bit imaginary portion. In successive CLK cycles, successive values of $x_i(F_i,f_i)$ appear on bus 7.

Also, the adder circuit 45 receives the 18-bit control bus 40 from the system control of FIG. 6. The adder circuit 45 provides the $X(P_i,p_i)$ output signal for values of $P_i$ equal to 0 on line 44 as previously described in connection with Eq.(28). Also the adder circuit 45 has a 32-bit output bus 43. The bus 43 contains, at different times, the values $x_i(F_i,f_i)$ for values of $F_i$ equal to 0, $SUM(F_i,f_i)$, $DIFF(F_i,f_i)$ as those terms are explained above in connection with Eqs.(15), (16) and (17). The bus 43 connects in common as an input to each one of a plurality of multiplier/accumulator circuits 46-1, . . . , 46-M. The computational element 11 performs an $N_i$-length DFT. The number M of multiplier/accumulator circuits in FIG. 7 is determined by letting M equal to $(N_i-1)/2$.

In FIG. 7, each multiplier/accumulator circuit calculates values of $X_i(P_i,p_i)$ and provides those values on its output buses. Specifically, the multiplier/accumulator circuit 46-1 produces the $X_i(P_i,p_i)$ values for $P_i$ equal to 1 on bus 48-1. Similarly, the multiplier/accumulator circuit 46-M produces the $X_i(P_i,p_i)$ values on bus 48-M for $P_i$ equal to M. The additional multiplier/accumulator circuits (implied but not shown) for the integers between 1 and M provide output values of $X_i(P_i,p_i)$ for values of $P_i$ between 1 and M. The outputs on lines 48-1, . . . , 48-M are all in accordance with Eq.(29) as previously explained.

Each of the multiplier/accumulator circuits of FIG. 7 also produces an output $X(P_i,p_i)$ on the buses 47-1, . . . , 47-M. Specifically, the bus 47-1 for multiplier/accumulator circuit 46-1 produces the output $X_i(P_i,p_i)$ for values of $P_i$ equal to $(N_i-k_i)$ for $k_i$ equal to 1. The multiplier/accumulator circuit 46-M produces the output $X_i(P_i,p_i)$ on the output bus 47-M for values of $P_i$ equal to $(N_i-k_i)$ for $k_i$ equal to M. The outputs on the lines 47-1, . . . , 47-M of FIG. 7 are all in accordance with Eq.(30) as previously explained.

The computational element 11 of FIG. 7 operates to process groups of input data values as given by Eq.(31) above. Each group of input data values corresponds to one row of the right-hand side of Eq.(31). For each group of input values of $X(F_i,f_i)$, that is for $F_i=0, \ldots, (N_i-1)$, a corresponding group of output values of $X(P_i,p_i)$ are formed for $P_i=0, \ldots, (N_i-1)$. The groups of input data, each having $N_i$ values, are processed to form corresponding groups of output data, each having $N_i$ values, until all N input values have been processed and all N output values have been formed. There are $N/N_i$ such groups. After this processing is completed, an $N_i$-length DFT has been performed. Each of the 38-bit buses 44, 48-1 through 48-M and 47-1 through 47-M are connected in common to form the 38-bit computational element output bus 16. The bus 16 is a typical bus associated with any of the computational elements of the kernels of FIG. 3, FIG. 4 or FIG. 5 computers. Each kernel has such a bus 16 as an output from the computational element.

Figure 8:
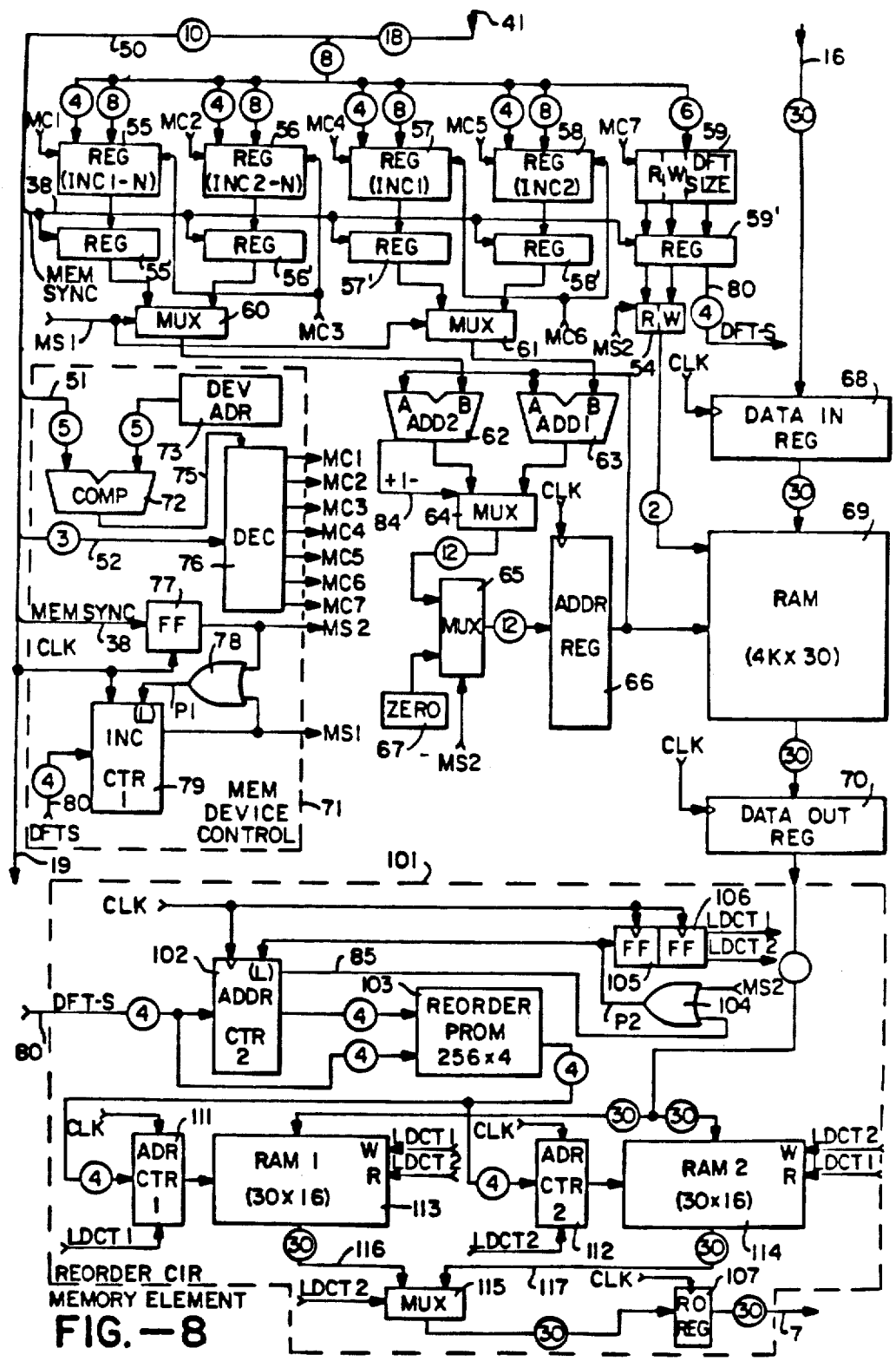
FIG. 8 depicts an electrical block diagram of a memory element which is typical of each of the memory elements of the present invention and particularly those forming part of the kernel of FIG. 2.

Memory Element—FIG. 8

In FIG. 8, a memory element typical of the memory elements 9 and 10 of FIG. 2 and each of the memory elements of FIG. 3 is shown. The memory element of FIG. 8 is a reorder means and includes a 30-bit input bus 16 for receiving the input data values. The memory element of FIG. 8 also has a 30-bit output bus 7 for providing the reordered output data values. The input reordering of the data values occurs when the memory element is used to supply input data to the computational element in accordance with the Chinese remainder theorem. When the memory element of FIG. 8 is employed to receive the output data from a computational element, then the output reordering is in accordance with the description previously given in connection with Eq.(5).

In FIG. 8, the input data to the memory element on bus 16 is clocked into a data-in register 68. The data-in register is a 30-bit register and provides data to the memory 69. That memory 69 is a conventional random access memory typically 4K by 30 bits. Each of the 4K 30-bit words can be separately addressed for writing or reading under control of the address register 66. Memory 69 writes the contents of the data in register 68 under the control of W signal from the register 54, into the address specified by the address register 66. Similarly, the data contents in memory 69 at the address specified by register 66 is read from the memory 69 under control of an R signal from the register 54. A 30-bit data word read from the memory 69 is clocked into the data-out register 70. The reordering of the data occurs by the appropriate selection of addresses for the address register 66.

The control of the memory element of FIG. 8 is achieved by the memory device control 71.

A control bus 41, which is one of the control buses 41-1, . . . , 41-Z from the system control 8 of FIG. 6, connects as an input to the memory element of FIG. 8. A 10-bit bus 50 which is a subset of the 18-bit bus 41 connects as an input to the device control 71. A 5-bit address bus 51 connects as an input to a comparator 72 in the memory device control 71. The memory device control 71 includes a hard-wired device address unit 73 providing a 5-bit input to the comparator 72. Each one of the memory elements in a computer of the present invention, the memory elements in FIG. 3 for example, has a different device address so that each memory element can be addressed separately by the system control 8. When the address on the bus 51 is the same as the device address supplied by the unit 73, then the comparator 72 provides a comparison equal output which enables a decoder 76. Decoder 76 receives a 3-bit input bus 52 from the bus 50 and decodes a unique one of the outputs MC1, . . . , MC7 in response to the 3-bit input on bus 52 when enabled by the output from comparator 72.

The outputs from decoder 76 provides the clocking inputs to the registers 55, 56, 57, 58 and 59. Each of the registers 55 through 59 receives an 8-bit field from the control bus 41. The 8-bit field is clocked into the register 55 under control of the MC1 signal, is clocked into the register 56 under control of the MC2 signal, is clocked into the register 57 under control of the MC4 signal, and is clocked into the register 58 under control of the MC5 signal. Each of the registers 55, 56, 57 and 58 also receives a 4-bit portion of the 8-bit field to provide in total a 12-bit input to each of the registers 55, 56, 57 and 58. One half of the 8-bit field is clocked into the register 55 under control of the MC3 signal. The other half of the 8-bit field is clocked into the register 56 under control of the same MC3 signal. In a similar manner, a 4-bit portion of the 8-bit field is clocked into the register 57 and the other half is clocked into the register 58 under control of the MC6 signal.

A 6-bit field from the bus 41 is clocked into the register 59 under control of the MC7 signal.

A number of registers 55' through 59' are provided for receiving the outputs from the registers 55 through 59, respectively. The registers 55' through 59' are clocked by the MEM SYNC line 38 from bus 41. Line 38 is one of the lines 38-1 through 38-Z from the FIG. 6 system control. The MEM SYNC signal on line 38 is activated at the commencement of the operation of the memory element of FIG. 8. When the FIG. 8 element is used as an input element, like element 9-1 of FIG. 3, the corresponding MEM SYNC signal will occur at one time. When used as an output element, like element 10-1 of FIG. 3, the corresponding MEM SYNC signal will occur at another later time.

The registers 55 and 55' store a 12-bit number identified as INC1-N. The registers 56 and 56' store a 12-bit number identified as INC2-N. The registers 57 and 57' store a 12-bit number identified as INC1. The registers 58 and 58' store a number identified as INC2. The registers 59 and 59' store a 4-bit field representing the DFT size. Registers 59 and 59' also store a 1-bit write (W) field and a 1-bit read (R) field. The 4-bit DFT size from the register 59' is output on the 4-bit bus 80 designated DFT-S. The R and W bits in register 59' connect as inputs to the 2-bit register 54. Register 54 is clocked to receive the contents of register 59' under control of the MS2 signal from the memory device control 71.

The R and W control signals from the register 54 connect to the memory 69 for controlling the reading and writing operations.

In FIG. 8, the reordering required in accordance with the present invention is carried out by adding the contents of the registers 55 through 58, using adders 62 and 63, to generate addresses for register 66.

The 12-bit outputs from the registers 55' and 56' are selected by the multiplexer 60 under control of the MS1 signal. The selected one of the outputs from registers 55' and 56' connect to the B input of the adder 62. The A input to the adder 62 is the address from the address register 66.

One or the other of the outputs from the registers 57' and 58' are selected by the multiplexer 61 under control of the MS1 signal. The selected one of the outputs from the registers 57' and 58' is connected as the B input to the adder 63. The A input to the adder 63 is the address from the address register 66. Multiplexer 64 selects either the address from the adder 62 or the address from the adder 63 as determined by whether or not the sign of the output from adder 62 is positive or negative as indicated on the +/− sign line 84. When the sign of the output from adder 62 is positive, then the output from adder 62 is selected by the multiplexer 64. When the sign of the output from adder 62 is negative, then the output from adder 63 is selected.

Multiplexer 65 receives the 12-bit output from the multiplexer 64 and receives an all 0 address from the hard-wired 0 address unit 67. Multiplexer 65 is controlled by the MS2 signal from the memory device control 71. The 0 address is selected by multiplexer 65 when the MS2 signal is logical 1 and which thus designates the beginning of an operation. After the 0 address is initially employed, the MS2 signal becomes logical 0 so that thereafter the 12-bit address from multiplexer 64 is selected. The 12-bit address from multiplexer 65 is loaded into the address register 66 by the CLK signal. The operation of the memory element of FIG. 8 is commenced in response to an MEM SYNC signal on a line 38 which is input to the flip-flop (FF) 77. Flip-flop 77 is clocked to store the MEM SYNC signal and responsively provides a logical 1 state for the MS2 signal. Prior to receipt of the MEM SYNC signal on line 38, all of the registers 55 through 59 have been previously loaded with the appropriate information by the system control of FIG. 8. The MEM SYNC signal transfers the preloaded information from the registers 55 through 59 to the registers 55' through 59'. The MS2 signal causes the R or W signal from register 59 to be stored in the register 54 thereby determining whether or not the memory 69 will be active to read information or to write information.

After the MS2 signal has been generated, the OR gate 78 generates a load parallel signal P1 which parallel loads the first increment select counter 79. Counter 79 is loaded, synchronously with the CLK signal by the 4-bit DFT-S signal on bus 80 which is output from the register 59'. The DFT size represents the number $N_i$ which is the length of the DFT to be performed. Each CLK signal decrements the counter 79 until the 0 count is reached. The 0 count output from counter 79 produces the MS1 signal. The MS1 signal is input to the OR gate 78 which generates the P1 signal and reloads the increment select counter 79 again with the DFT size. The counter 79 therefore counts modulus the group size (equal to $N_i$) continuously for all N values of the data which are to be written into or read from the memory 69.

In FIG. 8, the memory element has data values read from the memory 69 in accordance with the Chinese remainder theorem using different values of $R_i$ in accordance with Eq.(2) above. The values of INC1 and INC2 will change as a function of the size N of the DFT and the different values of $R_1, \ldots, R_L$ which appear in Eq.(2). The following Table I lists the decimal values of INC1 and INC2 both when data is to READ FROM the memory 69 to serve as an input to the computational element and when the data is to be received from the computational element to WRITE INTO the memory 69.

TABLE I

| MEMORY ELEMENTS - INCREMENTS FOR 4095-DFT | | | | | |
|---|---|---|---|---|---|
| | DFT SIZE | READ FROM | | WRITE INTO | |
| i | $N_i$ | INC1 | INC2 | INC1 | INC2 |
| 1 | 5 | 3276 | 0001 | 0819 | 1639 |
| 2 | 7 | 1170 | 0001 | 0585 | 3511 |
| 3 | 9 | 0910 | 0001 | 0455 | 3641 |
| 4 | 13 | 2835 | 0001 | 0315 | 1576 |

In TABLE I, the value of INC1 for a READ FROM the memory in the value of $R_i$ in Eq.(2). The value of INC2 is the summation of all the values of $R_i$ modulus N, in the present example i is equal to 1, 2, 3, 4. That number is 1.

In TABLE I, the value of INC1 for an output reordering of the data from a computational element which occurs during a WRITE INTO the memory of FIG. 8 is equal to $N/N_i$. The value of INC2 for the WRITE INTO operation for an output reordering is given by the following equation:

$$INC2 = [N/N_1 + R_2 + R_3 + R_4] \bmod$$
$$N = N + 1 - R_i + N/N_i$$

An example of the operation of the memory element of FIG. 8 operating in a READ FROM mode for a 4095 DFT will now be explained. Various quantities in the registers 55 through 59 are shown in the following TABLE II.

TABLE II

| N = 4095 | INC1 | = 3276 |
|---|---|---|
| i = 1 | INC2 | = 0001 |
| $N_i$ = 5 | (INC1-N) | = −819 |
| | (INC2-N) | = −4094 |

In operation, when the MS1 signal is active, the contents of registers 56' and 58' are selected by the multiplexers 60 and 61, respectively and otherwise, the contents of registers 55' and 57' are selected.

Also when the output from the first adder (ADD2) 62 is negative, then the contents of the first adder (ADD1) 63 are selected.

Prior to commencing the operation of the reordering by the memory element of FIG. 8, N values (in the present example, 4095 values) have been stored in the random access memory 69 in memory locations which are addressed in sequence specified by the index n. Specifically, x(0) is stored in the 0000 location, x(1) is stored in the 0001 location, x(2) is stored in the 0002 location and so on until x(4094) is stored in the 4094 location. These N values of x(n) are input reordered as the N values of $x_1(F_1,f_1)$. The input reordering occurs by selecting the appropriate order of addresses for fetching the data from the memory 69.

The address selection occurs in FIG. 8 when the MEM SYNC pulse occurs on bus 38. That pulse is stored in the flip-flop 77 by the CLK signal. Therefore, the next CLK pulse after the MEM SYNC pulse produces the MS2 signal which causes the zero address from the zero address unit 67 to be stored into the address register 66. The zero address addresses the memory 69 and fetches the data from the 0000 location, that is, the x(0) data previously stored there. The x(0) data is clocked into the data out register 70 as the $X_i(0,0)$ value and this value is the first value ($f_1=0$) of the reordered data $x_1(F_1,f_1)$. The manner in which subsequent values ($f_1 = 1, 2, \ldots, (N-1)$) are selected by generating and clocking addresses into register 66 is now described in connection with TABLE III.

TABLE III

"READ FROM" REORDERING

| $f_1$ | $F_1$ $n_1$ | $n_2$ | $n_3$ | $n_4$ | P1 | ADD2 | ADD1 | n ADD REG (66) |
|---|---|---|---|---|---|---|---|---|
| 0 | 0 | 0 | 0 | 0 | MS2 | | | 0000 |
| 1 | 1 | 0 | 0 | 0 | | — | 3276 | 3276 |
| 2 | 2 | 0 | 0 | 0 | | 2457 | | 2457 |
| 3 | 3 | 0 | 0 | 0 | | 1638 | | 1638 |
| 4 | 4 | 0 | 0 | 0 | | 0819 | | 0819 |
| 5 | 0 | 1 | 1 | 1 | MS1 | — | 0820 | 0820 |
| 6 | 1 | 1 | 1 | 1 | | 0001 | | 0001 |
| 7 | 2 | 1 | 1 | 1 | | 3277 | | 3277 |
| 8 | 3 | 1 | 1 | 1 | | 2458 | | 2458 |
| 9 | 4 | 1 | 1 | 1 | | 1639 | | 1639 |
| 10 | 0 | 2 | 2 | 2 | MS1 | — | 1640 | 1640 |
| 11 | 1 | 2 | 2 | 2 | | 0821 | | 0821 |
| 12 | 2 | 2 | 2 | 2 | | 0002 | | 0002 |
| 13 | 3 | 2 | 2 | 2 | | — | 3278 | 3278 |
| 14 | 4 | 2 | 2 | 2 | | 2459 | | 2459 |
| 15 | 0 | 3 | 3 | 3 | MS1 | — | | 2460 |
| 16 | 1 | 3 | 3 | 3 | | 1641 | | 1641 |
| 17 | 2 | 3 | 3 | 3 | | 0822 | | 0822 |
| 18 | 3 | 3 | 3 | 3 | | 0003 | | 0003 |
| 19 | 4 | 3 | 3 | 3 | | — | 3279 | 3279 |
| 20 | 0 | 4 | 4 | 4 | MS1 | — | 3280 | 3280 |
| 21 | 1 | | | | | 2461 | | 2461 |

In Table III, the $f_1$ value in the left-hand column is the one previously described in connection with Eq.(31). The $F_1$ value in TABLE III is the same as $n_1$. The values $n_1$, $n_2$, $n_3$, and $n_4$ in TABLE III are the values previously explained in connection with Eq.(2). In the first cycle of TABLE III ($f_1=0$ and $F_1=0$), the zero address is employed.

Referring to FIG. 8, in the next cycle of TABLE III, for $F_i=1$ and $f_i=1$, the second adder 62 has a minus 819 input from multiplexer 60 and register 55 and a 0 input from the register 66. The adder 62 output is negative, therefore, and multiplexer 64 selects the output from the first adder 63. The first adder 63 receives the number 3276 from multiplexer 61 and register 57 and the 0 input from the register 66. The output of the first adder 63 is, therefore, the number 3276 which is loaded into the address register 66 as the next address. Accordingly, the value of $x_1(F_1,f_1)$ is found at the n-index address 3276 in the memory 69. The data value from that location in memory is read from memory 69 and clocked into the data-out register 70 as the $x_1(F_1,f_1)$ reordered input data value for $F_1=f_1=1$.

The 3276 number in register 66 connects to the A inputs of the first and second adders 63 and 62. Adder 62 also has a minus 819 connected to the B input from the register 55 so that its output is 2457. That output is selected by multiplexer 64 and multiplexer 65 and is clocked into the address register 66. The data at the address 2457 in memory 69 is clocked into the data out register as the reordered $x_1(2,2)$ data value.

This process repeats calculating the new addresses 1638 and 0819 in the next two cycles, that is, the $f_1 = F_1 = 3$ and $f_i = F_i = 4$. In the next cycle, $f_1 = 5$ and $F_1 = 0$, the MS1 signal is generated and the output from the second adder is negative. The first adder 63, therefore, adds the value of 0001 from register 58 to the contents of the register 66 to form the new address as 0820. Therefore, the data value $x_1(0,5)$ would be the contents of the memory location at address 0820. In the next cycle, $f_1 = 6$ and $F_1 = 1$, the second adder 62 adds a minus 819 to the contents of the address register 66 so that the next address is 0001. The data value $x_1(1,6)$, is the contents of the memory 69 at address location 0001. The circuitry of FIG. 8 continues the processing in the manner indicated in TABLE III until all of the N values of $f_1$, the values from 0 through N−1, are accessed from memory 69.

The manner in which the address reordering and address generation continues is shown in the following TABLE IV. In TABLE IV, only the values of $F_1=0$ are shown. For each of the values of $n_2$, $n_3$ and $n_4$ in TABLE IV, there are five different values of addresses generated in the manner indicated in TABLE III.

TABLE IV

| $F_1$ $n_1$ | $n_2$ | $n_3$ | $n_4$ | ADD REG (66) |
|---|---|---|---|---|
| 0 | 0 | 0 | 0 | 0000 |
| 0 | 1 | 1 | 1 | 0820 |
| 0 | 2 | 2 | 2 | 1640 |
| 0 | 3 | 3 | 3 | 2460 |
| 0 | 4 | 4 | 4 | 3280 |
| 0 | 5 | 5 | 5 | 0005 |
| 0 | 6 | 6 | 6 | 0825 |
| 0 | 0 | 7 | 7 | 1645 |
| 0 | 1 | 8 | 8 | 2465 |
| 0 | 2 | 0 | 9 | 3285 |
| 0 | 3 | 1 | 10 | 0010 |
| 0 | 4 | 2 | 11 | 0830 |
| 0 | 5 | 3 | 12 | 1650 |
| 0 | 6 | 4 | 0 | 2470 |
| 0 | 0 | 5 | 1 | 3290 |
| 0 | 1 | 6 | 2 | 0015 |
| 0 | 2 | 7 | 3 | 0835 |
| 0 | 3 | 8 | 4 | 1655 |
| 0 | 4 | 0 | 5 | 2475 |
| . | . | | | |
| . | . | | | |
| . | . | | | |

In FIG. 8, an additional reordering of the data as it appears in the data-out register 70 occurs. That additional reordering is to facilitate the adder circuit 45 of FIG. 7 and FIG. 11 in its use of the data from the register 70.

In FIG. 8, the reordering circuit 101 includes a first random access memory 113 and a second random access memory 114. Memories 113 and 114 are each connected to receive the output from the data-out register 70. Each of the memories 113 and 114 are 30 bits wide and store up to 16 words in the present embodiment. When data is being written into the memory 113, data is being read from the memory 114. Each of the memories includes a read (R) and a write (W) control input. The write input to the memory 113 is controlled by the LDCT1 line and the read input is controlled by an LDCT2 line. The memory 114 has the same controls connected in the opposite manner such that the write input is controlled by the LDCT2 line and that read input is controlled by the LDCT1 input.

The LDCT1 and LDCT2 lines are the complementary outputs of the D-type flip-flop 106. Flip-flop 106 is clocked by the CLK signal and receives as an input the output from the T-type flip-flop 105. Flip-flop 105 is clocked by the CLK signal and toggles whenever it receives the P2 control signal from the gate 104. Gate 104 receives as one input the MS2 control signal from the flip-flop 77 in the memory device control 71. The other input to the OR gate 104 is the zero-out line 85 from a second address counter 102. The counter 102 is loaded with the DFT size whenever the load parallel output P2 from OR gate 104 is active. Counter 102 counts, therefore, by a modulus $N_i$ count which, in the present example being described is equal to 5. Counter 102 provides a 4-bit address for addressing the reorder PROM 103. PROM 103 is a conventional read only memory which receives as its high order address bits from the 4-bit DFT-S bus 80. The contents of the read only memory 103 are selected with addresses which function to reorder the data $x_i(F_i,f_i)$ in a manner which facilitates the use of that data by the adder circuit 45 of FIG. 11. There are $F_i$ different addresses. For the example being described, $F_i$ has the $N_i$ values 0, 1, 2, 3, and 4.

The read only memory 103 connects its 4-bit output bus as an input to a first address counter 111 and to a second address counter 112. When address counter 111 is writing data from the data out register 70 into the first memory 113, the address counter 111 is loaded for each data value in register 70 in accordance with the desired reordered address as specified by the read only memory 103. In the present example of TABLE III, $N_i$ is $N_1$ equal to 5. Therefore, in the first operation five values of data from the register 70, designated as $x_1(0,0)$, $x_1(1,1)$, . . . , $x_1(4,4)$, are loaded into the memory 113. The next value of data, corresponding to $f_1$ equal to 5 in TABLE III, is stored in the second memory 114. At the $f_1$ equal to 5 time, the flip-flop 106 has been switched to make the LDCT2 output active and LDCT1 inactive. The switching of LDCT1 inactive causes the address counter 111 to be cleared to 0 and causes the address counter 112 to receive the inputs from the read only memory 103. The next $N_i$ values of data from register 70 (5 in the present example) are loaded into the memory 114. These next five values of data are $x_1(0,5)$, $x_1(1,6)$, . . . , $x_1(4,9)$. The order in which they are stored in memory 114 is determined by the output addresses from the memory 103. While those five addresses are being written into memory 114, the memory 113 is being addressed to read out the $N_i$ values previously stored therein. The address counter 111 is counted in sequence from its 0 address up to the value of $N_i-1$ which is 4 in the present example. After the fifth address is read out from memory 113, the LDCT1 pulse will again become active and the LDCT2 line will become inactive so that the role of the counters 111 and 112 becomes reversed. The order in which the $x_1(F_1,f_1)$ data is output from the memory 113 for the first five values is $x_1(0,0)$, $x_1(1,1)$, $x_1(4,4)$, $(x_12,2)$, and $x_1(3,3)$.

In a similar manner, the order in which the data will be addressed from the memory 114 for the next five data values is $x_1(0,5)$, $x_1(1,6)$, $x_1(4,9)$, $x_1(2,7)$, and $x_1(3,8)$. The memories 113 and 114 continually alternate loading and unloading of data until all N values of data have been accessed and read out onto the bus 7 through reorder output register 107. In general, the order of output data is $x_1(0,f_1)$, $x_1(1,f_1)$, $x_1(4,f_1)$, $x_1(2,f_1)$, $x_1(3,f_1)$. The selection of data output from memory 113 or memory 114 is by the multiplexer 115. When the LDCT2 line is active, the 30-bit output bus 116 from the memory 113 is selected and when that signal is inactive the 30-bit output bus 117 from memory 114 is selected.

The memory element of FIG. 8 provides input reordering of data when the memory element functions as supplying input data to a computational element over bus 7. When such data is thus reordered, the reorder circuit 101 additionally reorders the data in a form more convenient for the adder circuit of FIG. 11.

In addition to those reordering functions, another memory element of the FIG. 8 type also reorders the data output a computational element. The data to be reordered appears on the bus 16 as an input to the data in register 68. The output reordering of the data occurs, before writing into the memory 69, in the same basic way that the reordering occurs for reading out the data from memory 69. Specifically, the addresses for writing data are selected through operation of the registers 55' through 58'. Those registers are stored, however, with the appropriate values from the WRITE INTO columns of TABLE I.

The memory element of FIG. 8 performs one additional function when input data such as from a data source 2 of FIG. 1 is initially to be written into the memory 69 or when output data such as to a datasink 4 of FIG. 1 is finally to be read from the memory 69. The data from the data source 2 is organized in the order of the index n and hence requires no reordering. When the memory element of FIG. 8 is to write data into the memory 69 without any reordering, then the registers 55 through 58 are all filled with unity. In this way, the address register 66 commences with the 0 address and each address thereafter is incremented by 1 from the previous address. Similarly, the data output to datasink 4 should be in order of the index k and hence will need no reordering. The reorder circuit 101 in this case will receive all 0's, 80 of which will result in no additional reordering.

The memory element of FIG. 8 provides the input data to the adder circuit 45 within the computational element 11 of FIG. 7. Also, another FIG. 8 memory element receives the output data from the computational element 11 on bus 16. The computational element 11 of FIG. 6 interacts with the memory elements in the manner hereinafter described.

Figure 9:
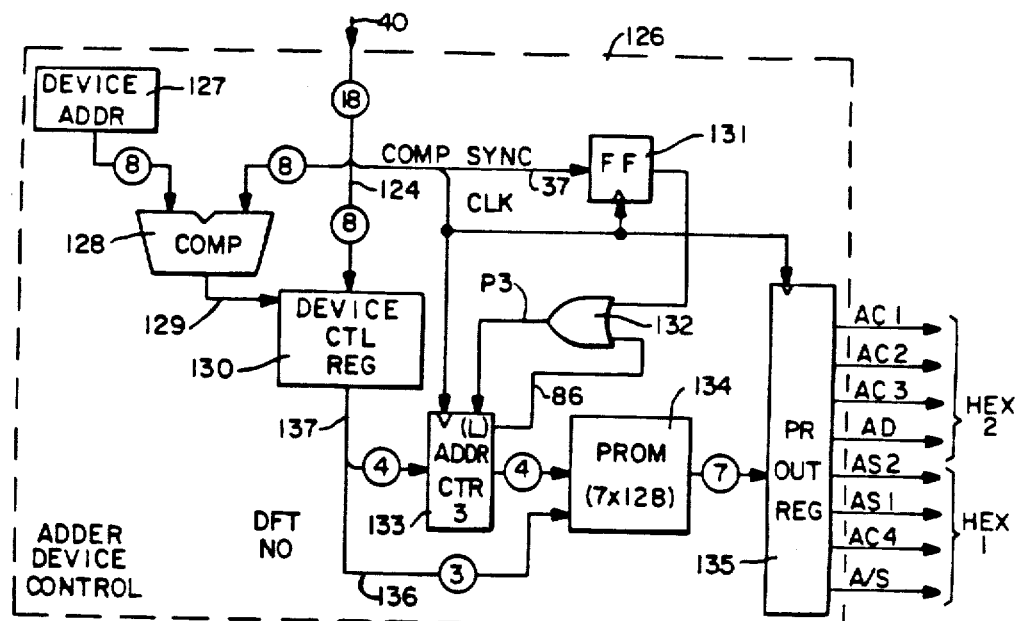
FIG. 9 depicts an electrical block diagram of an adder device control which forms part of the adder circuit within the computational element of FIG. 7.

Adder Device Control—FIG. 9

Figure 11:
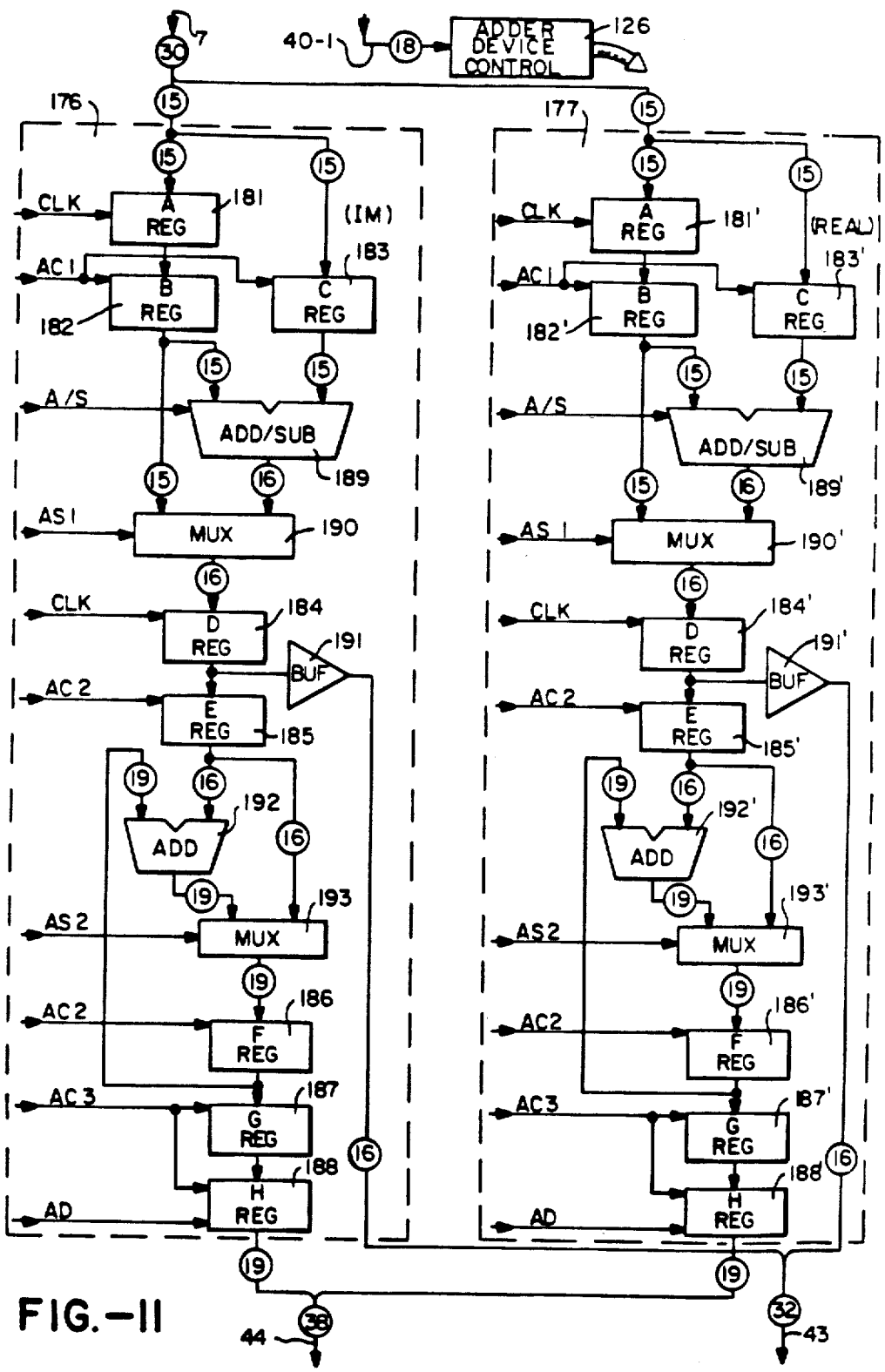
FIG. 11 depicts an electrical block diagram of the adder circuit forms a part of the computational element of FIG. 7.

In FIG. 9, further details of the adder device control which functions to control the adder circuit 45 in FIG. 7 (which is the adder circuit of FIG. 11). The adder device control receives the 18-bit control bus 40 from the system control 8 of FIG. 6. The bus 40 in FIG. 9 is one of the buses 40-1 through 40-Y in FIG. 6. Eight bits from bus 40 are input to a comparator 128. The other 8-bit input to the comparator 128 is from the device address unit 127. The device address unit 127 provides a hard-wired input which enables the particular adder device control of FIG. 9 to be uniquely addressed by control unit 8. When the address from bus 40 matches the address from unit 127, the comparator provides an equal output on line 129 which enables the control information on the 8-bit control bus 124 (from the 18-bit bus 40) to be stored in the device control register 130.

In FIG. 9, the control register 130 stores a 4-bit number representing the DFT size, $N_i$. The DFT size from register 130 forms an input on the 4-bit bus 137 to the address counter 133. The three high-order bits from the DFT size bus 137 are input on the 3-bit bus 136 to address the high-order field of the programmable read only memory 134. The count from the address counter 133 forms an additional low-order 4-bit address input to the memory 134. Memory 134 has a capacity of 128 7-bit control words. Each 7-bit control word output from memory 134 connects as an input to the PROM output register 135. Address counter 133 is loaded with the 4-bit DFT size count from bus 137 under control of the load parallel signal P3 output from the OR gate 132. Gate 132 is satisfied to provide the P3 control signal whenever either one of its two inputs is satisfied. One input to the OR gate 132 is derived from the flip-flop 131. Flip-flop 131 receives as an input the COMP SYNC signal on the line 37 from the bus 40. In FIG. 9, the COMP SYNC line 38 is one of the lines 38-1 through 38-Z of FIG. 6. When the COMP SYNC signal is clocked into the flip-flop 131, gate 132 is satisfied to provide the P3 signal and initially load the address counter 133. Thereafter, each CLK signal decrements the counter 133 until the 0 count is reached. The zero-out line 86 output from the counter 133 forms the other input to the OR gate 132. Each time counter 133 is decremented to 0 the zero-out line 86 is active to satisfy gate 132 and reload the count from the register 130 into counter 133.

In operation, the address counter 133 functions to count modulus $N_i$. Each of the $N_i$ different counts for counter 133 forms a different low-order address input for the memory 134 and causes the memory 134 to provide eight different control outputs which are clocked into the register 135. The eight control bits in register 135 are designated as the control bits AC1, AC2, AC3, AD, AS2, AS1, AC4, and A/S. The first four bits AC1, AC2, AC3, and AD form a first hexadecimal word designated HEX2. The second set of four bits AS2, AS1, AC4 and A/S form a hexadecimal word designated HEX1. The manner in which the eight control bits from the register 135 control the adder circuit 45 will be explained in connection with FIG. 11.

In a specific example of the adder device control where $N_1$ is equal to 5, the 3-bit number on bus 136 is a binary representation of the DFT size 5. The binary number on bus 137 is a binary 4 which is the value of $N_1-1$. In this example, the adder 133 is decremented from 4 to 0 thereby providing 5 low-order address bits as an address input to the memory 134.

Figure 10:
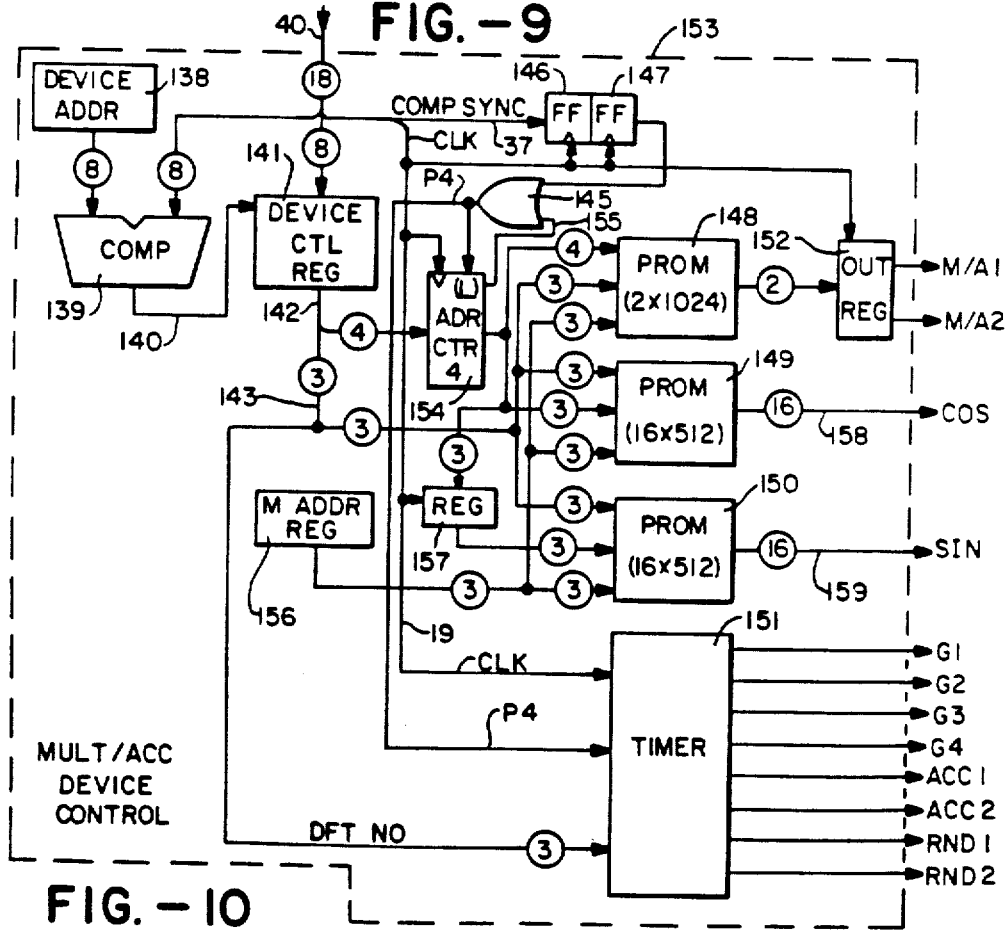
FIG. 10 depicts an electrical block diagram of a multiplier/accumulator device control which is typical of the control portion of each of the multiplier/accumulator circuits within the computational element of FIG. 7.

Multiplier/Accumulator Device Control—FIG. 10

In FIG. 10, the multiplier/accumulator device control 153 is typical of a control which is present in each one of the multiplier/accumulator circuits 46-1 through 46-M of FIG. 7. In FIG. 10, the control 153 receives the control bus 40 from the system control 8 of FIG. 6. In FIG. 10, the bus 40 is one of the buses 40-1 to 40-Y in FIG. 6. Control bus 40 has an 8-bit field connected as an input to the comparator 139. The input to comparator 139 is the 8-bit bus from the hard-wired device address unit 138. When the device address of unit 138 is the same as the address on the 8-bit field of the bus 40, comparator 139 provides an equal output on line 140. The output on line 140 enables an 8-bit control field from bus 40 to be stored in the device control register 141. The remaining two bits from the bus 40 are the COMP SYNC line 37 and the CLK line 19. The COMP SYNC line 37 (one of the lines 37-1 through 37-Y of FIG. 6) is input to the first stage 140 of flip-flops 146 and 147. The COMP SYNC signal is clocked into flip-flop 146 which in turn is clocked into the second stage flip-flop 147. Flip-flops 146 and 147 function as a two cycle delay of the COMP SYNC signal. After the two stage delay, the output of flip-flop 147 connects as an input to the OR gate 145. The load parallel output P4 from the gate 145 connects as the load (L) input to the address counter 154 and timer 151. When the P4 signal is active, counter 154 is loaded with the value of ($N_i-1$) from the 4-bit bus 142 from the control register 141. Counter 154 has a 1-bit zero-out line 155 which connects as a second input to the OR gate 145. When counter 154 is decremented to the zero count, the output on line 155 reloads the ($N_1-1$) value from bus 142 into the counter 154. In this way, counter 154 counts modulus $N_i$. Counter 154 has its output connected as an input to the programmable read only memory 148. Similarly, the three high-order bits from counter 154 are connected as inputs to the programmable read only memory 149 and to a 3-bit register 157. The three high-order bits are clocked into register 157 to provide a one cycle delay for the three high-order bits from counter 154. The delayed high-order bits from register 157 provide an address input to the programmable read only memory 150.

The three high-order bits of the DFT size on bus 142 appear on bus 143 which connects to each of the memories 148, 149 and 150. The 3-bit bus 143 also connects as an input to the timer 151.

In FIG. 10, the memories 148, 149 and 150 receive an additional address input from the M address unit 156. The M address unit 156 is typically a hardwired circuit (or a register loaded by device control register 141) providing some value from 1 through M which corresponds to the particular one of the multiplier/accumulator circuits 46-1 through 46-M of FIG. 7 to which the particular device 153 of FIG. 10 corresponds.

In FIG. 10, the memory 148 contains 1,024 2-bit words. When addressed by the address bits described, memory 148 provides a 2-bit control word output which is clocked into the output register 152. The control bits in register 152 are designated as M/A 1 and M/A 2.

In FIG. 10, the memory 149 contains values of the cosine function each represented by a 16-bit word. Memory 149 contains 512 of those 16-bit words. The output from the memory 149 is designated as the COS bus 158.

In a similar manner, the memory 150 contains 512 16-bit words representing values of the sine function. The output from memory 150 is a 16-bit SIN bus 159.

In FIG. 10, the timer 151 provides various timing output signals as a function of the CLK signal, the gate 154 output P4, and the DFT number designated by the value of i. The outputs of the timer 151 are G1, G2, G3, G4, ACC1, ACC2, RND1, and RND2. The timing relationship between these output signals from the timer 151 will be explained hereinafter in connection with the operation of the multiplier/accumulator circuit of FIG. 12.

Adder Circuit—FIG. 11

In FIG. 11, further details of the adder circuit 45 of FIG. 7 are shown. In FIG. 11, the adder circuit includes an adder device control 126 which has been previously explained in connection with FIG. 9. The adder of FIG. 11 includes a 30-bit input bus 7 for receiving input data values. Bus 7 is received from a memory element like that previously described in connection with FIG. 8. The 30-bit bus 7 is split into two 15-bit buses, one which connects as an input to the imaginary adder unit 176 and one of which connects to the real adder unit 177. The adder units 176 and 177 are identical and therefore the reference numerals for components in the unit 177 are identical in number to the components in the unit 176 with a prime added. The control lines, output from the output register 135 in the device control 126 (see FIG. 9), connect both units 176 and 177.

In FIG. 11, the unit 176 includes an A register 181 which receives the imaginary component from the bus 7 each CLK signal. Contents of the A register 181 are transferred to the B register under control of the AC1 signal and at the same time, the imaginary portion from the bus 7 is clocked into the C register 183. The adder/subtractor 189 adds the contents of the B and C registers or subtracts the contents of the C register from the B register under the control of the A/S signal. When A/S is a logical 1, the unit 189 performs an addition and when a logical 0, a subtraction.

In FIG. 11, the multiplexer 190 selects the output from the adder unit 189 for clocking into the D register 184 when AS1 is a logical 1. When AS1 is a logical 0, the contents of the B register 182 are clocked into the D register 184. The 16-bit output from the D register 184 connects through a conventional buffer 191 to provide the imaginary portion to the output bus 43. Also the 16-output from register 184 is connected as an input to the E register 185. The contents of the D register are stored in the E register when the AC2 pulse is a logical 1. The contents of the E register 185 are connected as one input to an adder 192 and are also connected as one input to a multiplexer 193. Multiplexer 193 also receives the 19-bit output from the adder 192. Multiplexer 193 selects the output from adder 192 whenever A/S2 is a logical 1 and selects the output from the E register 185 whenever A/S2 is a logical 0. The selected outputs from multiplexer 193 is stored in the F register 186 whenever the AC2 line is a logical 1. The output from the F register 186 provides a 19-bit input to the adder 192. The contents of the F register 186 are stored in the G register 187 whenever the AC3 line is a logical 1. Similarly the contents of the G register 187 are transferred to the H register 188 whenever AC3 is a logical 1.

The 19-bit output from the H register 188 is combined with the 19-bit output from the H register 188' to provide the 38-bit output on bus 44. CONTROL BIT AD selects when the outputs, from registers 188 and 188' are to be driven onto the output bus 44. The output values of data on line 44 are those previously described in connection with Eq.(28) above.

In FIG. 11, the output bus 43 contains the imaginary (from buffer 191) and the real (from buffer 191') portions which at different times correspond to the data values $x_i(F_i,f_i)$, for values of $F_i$ equal to 0, and to the values $SUM(F_i,f_i)$ as given by Eq.(26) and $DIFF(F_i,f_i)$ as given by Eq.(27). These values on bus 43 are input to each of the multiplier/accumulator circuits 46-1 through 46-M of FIG. 7.

Figure 12:
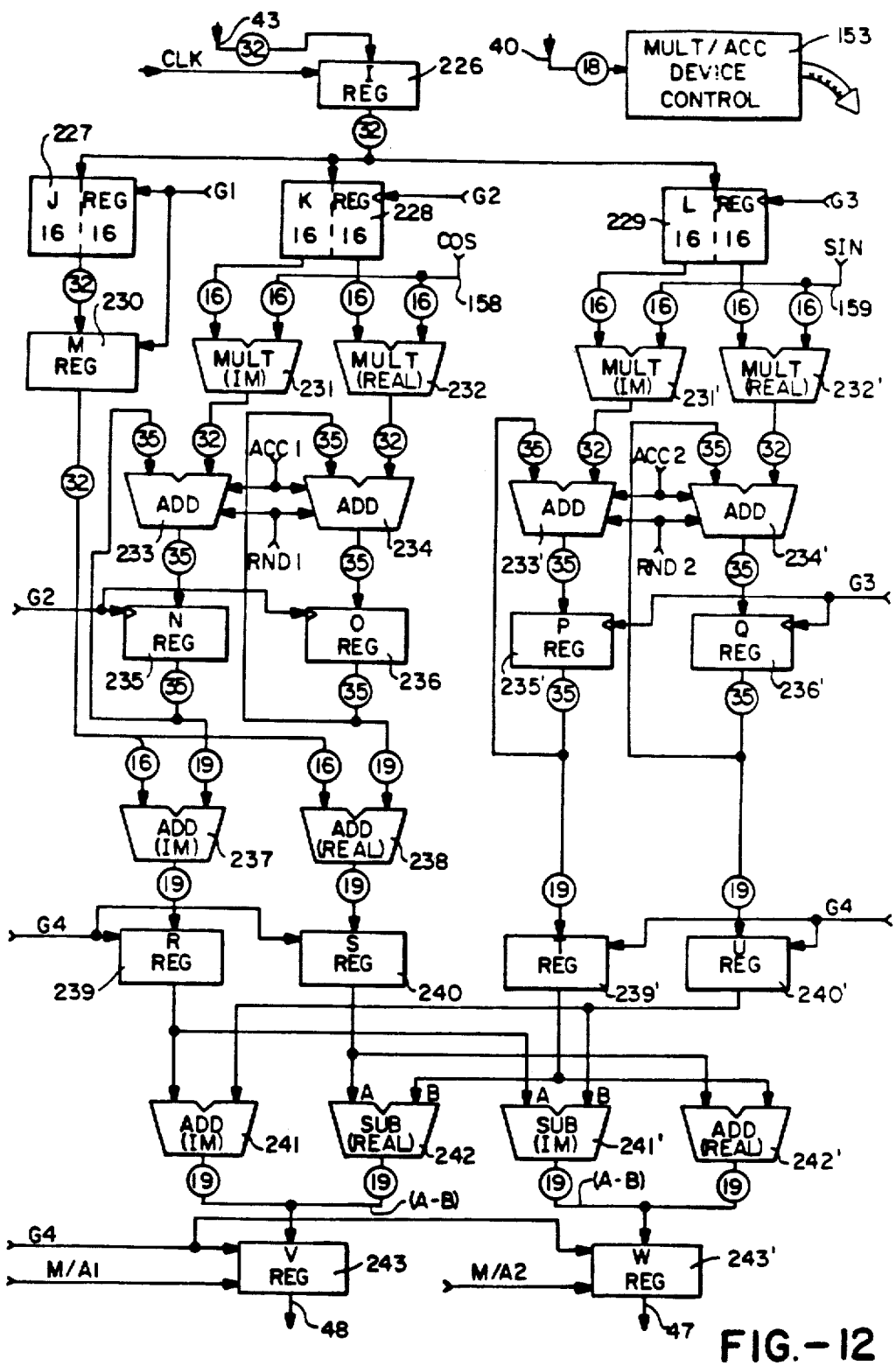
FIG. 12 depicts an electrical block diagram of a typical one of the multiplier/accumulator circuits which form a part of the computational element of FIG. 7.

Multiplier/Accumulator Circuit—FIG. 12

In FIG. 12, a multiplier/accumulator circuit 46 typical of each of the M multiplier/accumulator circuits 46-1 through 46-M of FIG. 7 is shown. In FIG. 12, the I register 226 receives the 32-bit bus 43 from the adder circuit 45 from FIG. 7 and FIG. 11. Data from the adder circuit is clocked into the register 226 each CLK pulse. The 32-bit bus output from register 226 connects as an input to the J register 227, the K register 228 and the L register 229. The registers 227, 228 and 229 are loaded with the contents of the I register 226 under control of the G1, G2 and G3 control lines, respectively, from the timer 151 in the multiplier/accumulator device control of FIG. 10. The J register 227 is gated by the G1 line to receive the values of $x_i(F_i,f_i)$ for values of $F_i$ equal to 0. The contents of the register 227 are transferred to the M register 230 each time a G1 control signal is received. The registers 227 and 230 both contain an imaginary 16-bit portion and a real 16-bit portion. The output from the M register 230 connects the imaginary portion as one input to the adder 237 and the real portion as one input to the adder 238.

In FIG. 12, the K register 228 also has a 16-bit imaginary portion which connects as an input to the multiplier 231 and a real portion which connects as one input to the multiplier 232. The other input to the multipliers 231 and 232 is the COS bus 158 from the control of FIG. 10.

The K register 228 is loaded with the values of $SUM(F_i,f_i)$ under the control of the G2 control line. The multipliers 231 and 232 function to multiply the SUM and the cosine factors in Eq.(29) and in Eq.(30). The outputs from the multipliers 231 and 232 function as inputs to the adders 233 and 234, respectively. The outputs from adders 233 and 234 connect as inputs to the N register 235 and the O register 236, respectively. The output from registers 235 and 236 feedback as the other inputs to adders 233 and 234, respectively. The outputs from adders 233 and 234 are clocked into the registers 235 and 236 under the control of the G3 control line. Adders 233 and 234 and registers 235 and 236 function to perform the summation for $F_i$ equal to 1. through M for the cosine terms in Eqs.(29) and (30). The outputs from registers 235 and 236 each form one of the inputs to the adders 237 and 238, respectively. Only the 19 most significant bits from the registers 235 and 236 are employed as inputs to the adders 237 and 238. Adders 237 and 238, as previously indicated, receive the $x_i(F_i,f_i)$ values, for $F_i$ equal to 0, from register 230 as the other input. Adders 237 and 238 function, therefore, to add the first two terms of Eq.(29) and the first two terms of Eq.(30) and to store the results, under control of the G4 line, into the R register 239 and the S register 240, respectively.

In FIG. 12, the $DIFF(F_i,f_i)$ term from the register 226 is stored into the L register 229 under control of the G3 line. Register 229 stores a 16-bit imaginary part which serves as an input to the multiplier 231' and a 16-bit real portion which serves as one input to the multiplier 232'. The other input to the multipliers 231' and 232' is the SIN bus 159 from the multiplier/accumulator device control 153 of FIG. 10. The multipliers 231' and 232' function to multiply the DIFF and sine factors of Eqs.(29) and (30). The outputs from the multipliers 231' and 232' form inputs to the adders 233' and 234', respectively. The outputs from adders 233' and 234' connect as inputs to the E register 235' and the Q register to 236', respectively, under control of the G3 line. The outputs from the registers 235' and 236' connect as the other inputs to the adders 233' and 234', respectively. The adders 233' and 234' and the registers 235' and the 236' form the summations of the sine terms in Eqs.(29) and (30) for values $F_i$ equal to 1 through M. The most significant 19 bits output from each of the registers 235' and 236' are stored into the T register 239' and the U register 240', respectively, under control of the G4 control line. The contents of the registers 239' and 240' correspond, at different times, to the last term of Eq.(29) and of Eq.(30). The contents of the registers 239' and 240' are multiplied by the operator plus j where j is equal to the square root of $-1$, for Eq.(29) and by the operator minus j for Eq.(30). This multiplication by the positive and negative j operator is accounted for in connection with the inputs to the adders and subtractors 241 and 242 and 241' and 242'. The sum of the first two terms of Eqs.(29) and (30) appear in the registers 239 and 240. The imaginary part is in register 239 and the real part is in register 240.

In order to form the imaginary output portion of Eq.(29), the imaginary portion from register 239 is added to the real portion from the register 240' (which is multiplied by the plus j operator) to form the imaginary value represented by the Eq.(29). In order to form the real portion of Eq.(29), the contents of register 240 have the contents of register 239' (which is multiplied by the plus j operator) subtracted therefrom in subtractor 242. The imaginary portion is the 19-bit output from the adder 241 which is merged with the 19-bit real portion from the subtractor 242 and stored in the V register 243 under control of the G4 control line.

In order to form the real and imaginary portions representing Eq.(30), the subtractor 241' and the adder 242' are employed. The imaginary portion is formed by subtracting the real quantity in register 240' (multiplied by the minus j operator) from the imaginary quantity in the register 239. The adder 242' adds the real quantity in the register 240 to the imaginary quantity in register 239' which is converted to a positive real quantity by multiplication by the minus j operator. The imaginary quantity from subtractor 241' together with the real quantity from adder 242' are merged to form the complex 38-bit data value which is stored in the V register 243' under control of the G4 control line. The value in the register 243' corresponds to the complex data value in accordance with Eq.(30) above and the value in register 243 corresponds to the complex data value explained in connection with Eq.(29) above.

In FIG. 12, the 38-bit output bus from register 243 as designated as bus 48-$F_i$ and the 38-bit bus output from register 243' is designated as the bus 47-$F_i$. As previously explained in connection with Eqs.(29) and (30), the value of $F_i$ ranges from 1 through M. In FIG. 7, the multiplier/accumulator 46-1 would have an output 48-1 and an output 47-1. In FIG. 12, the value of $F_i$ for the multiplier/accumulator 46-1 of FIG. 7 is 1.

Operation

The operation of the present invention is explained in connection with a pipeline sum and difference conjugate prime factor transform computer of the FIG. 3 type. Furthermore, the value of N is selected to be 4095 with $N_i$ having i equal to 1, 2, 3, and 4. Specifically, $N_1$ is equal to 5, $N_2$ is equal to 7, $N_3$ is equal to 9, and $N_4$ is equal to 13. The value of L in FIG. 3 is equal to 4.

In order to explain the operation of the pipeline computer of FIG. 3, first a description is given of the timing of a single kernel, such as kernel 12-1 of FIG. 3. For purposes of this explanation, it is assumed that the memory 9-1 has been loaded with N values of input data, x(n), indexed with the index n where n has the values 0, 1, ..., N−1. In the present example, it is also assumed that the computer of FIG. 3 is performing a 4095-length DFT and that the first prime factor is 5, that is, $N_1$ is equal to 5. The sequencer of FIG. 6, prior to the time under discussion, has loaded the registers 55 through 58 with the values previously identified in TABLE II. Furthermore, the register 59 is loaded with the R bit active and the W bit inactive. The DFT size is set in register 59 to indicate a 5. It is assumed that in FIG. 3, the memory 9-1 receives control bus 41-1, that computational element 11-1 receives control bus 40-1, and memory element 10-1 receives control bus 41-2 from the system control of FIG. 6.

The operation commences when the system control of FIG. 6 issues a logical 1 for the MEM SYNC1 pulse on line 38-1 and on the next clock pulse that 1 is clocked into the flip-flop 77 in FIG. 8 activating the MS2 signal and transferring the contents of registers of 55 through 59 to the registers 55' through 59'. The operation then continues in accordance with the system timing shown in TABLE VI.

TABLE VI

| SINGLE KERNEL TIMING | | | | | | | | | | | | | |
|---|---|---|---|---|---|---|---|---|---|---|---|---|---|
| CLK | 0 | 1 | 2 | 3 | 4 | 5 ... (4 + $N_i$) ... | (10 + 3$N_i$) | (11 + 3$N_i$) | (12 + 3$N_i$) | (13 + 3$N_i$) | (14 + 3$N_i$) | (15 + 3$N_i$) |
| DFT-5 CLK | 0 | 1 | 2 | 3 | 4 | 5 ... 9 ... | 25 | 26 | 27 | 28 | 29 | 30 |
| MEM SYNC1 (TO CE) | 1 | | | | | | | | | | | | |
| COMP SYNC | | | 1 | | | | | | | | | | |
| MEM DATA OUT (line 7) | | | | | | $x_i(F_i,0)$ | | | | | | | |
| CE DATA OUT (line 16) | | | | | | | | $X_i(P_i,0)$ | $X_i(P_i,1)$ | $X(P_i,2)$ | $X_i(P_i,3)$ | $X_i(P_i,4)$ |
| MEM SYNC2 (FR CE) | | | | | | 1 | | | | | | | |
| P1 (TO CE) | 1 | | | | | | | | | | | | |
| P1 (FR CE) | | | | | | | | 1 | | | | | |

TABLE VI shows the system timing for a generalized kernel of any prime factor size $N_i$ commencing at the CLK 0 time. In TABLE VI, the upper line of CLK pulses is given in terms of the $N_i$ DFT size. The second line of CLK pulses in TABLE VI is given when $N_i$ is equal to 5. When the MEM SYNC1 pulse occurs at the 0 CLK time, the COMP SYNC1 pulse occurs at the CLK 5 time. The COMP SYNC1 pulse is the one which is input to the flip-flop 131 in the adder device control of FIG. 9 (for computational element 11-1 of FIG. 3) and is input to the flip-flop 146 in the multiplier/accumulator device control of FIG. 10. In response to these initial synchronization pulses, the memory unit of FIG. 8 (representing input memory 9-1 of FIG. 3), produces the first value of reordered output data at the 4+$N_i$ time which, where for the 5-length DFT is the 9th CLK time. The reordered data at CLK 9 is input to the computational element like the one of FIG. 7. The computational element functions to perform the 5-length DFT. The output data from the computational element of FIG. 7 (representing element 11-1 of FIG. 3) occurs at the 11+3$N_i$ CLK which, for a 5-length DFT, is the 26th CLK pulse.

The first data value, $X_i(F_i,0)$ output on the memory bus 7 at CLK 26 time is followed over the next N−1 clock times by the remaining values of input data in the manner previously described in connection with TABLES III and IV and the reorder circuit 101 of FIG. 8.

For the 5-length DFT, the memory data out on line 7-1 in FIG. 3 (line 7 in FIG. 8) is in the order of $F_1=0, 1, 4, 2, 3$.

The data output from the computational element commences at the clock time $(4+4N_i)$ and is the data value $X_i(P_i,0)$. For $N_1$ equal to 5, the first value of data at clock time 26 is $X_1(P_10)$ which is $X_1(0,0)$. Similarly, the next clock time, 27, produces the data value $X_1(1,1)$. Each successive clock time, until a total of N clock times have occurred, produces an output data value $X_1(P_1,p_1)$.

In FIG. 3, the output memory element 10-1 receives on its input bus 16-1 (bus 16 of FIG. 8) the data value nary proportion stored in the A register 181 and its real portion stored in the A register 181' of FIG. 11.

This storage in registers 181 and 181' occurs by operation of the 8th CLK pulse. The timing for each of the control signals output from the PROM 135 of the adder device control of FIG. 9 is shown in the following TABLE VII, commencing with the 10th clock pulse. The clock pulse numbering in TABLE VII corresponds to the clock pulse numbering in TABLE VI. Additionally, in TABLE VII, the P3 control signal is the signal output from the OR gate 132 in FIG. 9. The P3 signal loads the address counter 133 for sequencing the control output from the memory 134 of FIG. 9.

TABLE VII

| | DFT-5 ADDER PROM DATA | | | | | | | | | | | | | | | | | |
|---|---|---|---|---|---|---|---|---|---|---|---|---|---|---|---|---|---|---|
| CLK | 10 | 11 | 12 | 13 | 14 | 15 | 16 | 17 | 18 | 19 | 20 | 21 | 22 | 23 | 24 | 25 | 26 | 27 |
| P3 | 0 | 1 | 0 | 0 | 0 | 0 | 1 | 0 | 0 | 0 | 0 | 1 | 0 | 0 | 0 | 0 | 1 | 0 |
| AC1 | 1 | 1 | 0 | 1 | 0 | 1 | 1 | 0 | 1 | 0 | 1 | 1 | 0 | 1 | 0 | 1 | 1 | 0 |
| AC2 | 1 | 0 | 1 | 1 | 0 | 1 | 0 | 1 | 1 | 0 | 1 | 0 | 1 | 1 | 0 | 1 | 0 | 1 |
| AC3 | 0 | 0 | 0 | 1 | 0 | 0 | 0 | 0 | 1 | 0 | 0 | 0 | 0 | 1 | 0 | 0 | 0 | 0 |
| AD | 0 | 1 | 0 | 0 | 0 | 0 | 1 | 0 | 0 | 0 | 0 | 1 | 0 | 0 | 0 | 0 | 1 | 0 |
| HEX2 | C | 9 | 4] | [E | 0 | C | 9 | 4] | [E | 0 | C | 9 | 4] | [E | 1 | C | 9 | 4] |
| AS2 | 1 | 1 | 1 | 0 | 1 | 1 | 1 | 1 | 0 | 1 | 1 | 1 | 1 | 0 | 1 | 1 | 1 | 1 |
| AS1 | 1 | 0 | 1 | 1 | 1 | 1 | 0 | 1 | 1 | 1 | 0 | 1 | 1 | 1 | 1 | 0 | 1 |
| AC4 | 0 | 1 | 0 | 0 | 0 | 0 | 1 | 0 | 0 | 0 | 1 | 0 | 0 | 0 | 0 | 1 | 0 |
| A/S | 0 | 1 | 1 | 0 | 1 | 0 | 1 | 1 | 0 | 1 | 0 | 1 | 1 | 0 | 1 | 0 | 1 | 1 |
| HEX1 | C | B | D] | [4 | D | C | B | D] | [4 | D | C | B | D] | [4 | D | C | B | D] |

$X_1(P_1,0)$ output during the 26th clock pulse from the computational element 16-1. At the 27th clock pulse, that data value is stored in the data in register 68 in FIG. 8. On the 25th clock pulse, the MEM SYNC signal to the memory element 10-1 is energized causing the P1 pulse from OR gate 78 of FIG. 8 to load the increment counter 79. Also, the registers 55 to 59 have their contents dumped into the registers 55' to 59'. These registers have previously been loaded in accordance with the TABLE I data using the WRITE INTO values for i equal to 1, $N_i$ equal to 5. For the data out memory 10-1, the W bit in register 59 is in the active state while the R bit is in the inactive state. Using these register values, the memory element of FIG. 8 calculates the addresses for the address register 66 in a manner which reorders the data from the computational element 16-1, for storage in the memory 69 of FIG. 8, in accordance with the order originally established by the input index n.

DFT-5 Operation

With the overall timing of a single kernel as given in TABLE VI above, the details of the adder circuit 45 operation within the computational element 11 of FIG. 7 (element 11-1 of FIG. 3) of that kernel are now described. The first data value out from the memory element of FIG. 8 and input to the adder circuit on the bus 7 appears at clock $4+N_i$ time. At the next clock time, 10 for a 5-length DFT, the first data value has its imagi- In TABLE VII, the AC1, AC2, AC3 and AD control bits are grouped so that together they represent a hexadecimal character, HEX2. The four bits forming the HEX2 character for the clock 10 pulse are 1100 which is a hexadecimal C character. Similarly, the outputs for the clock 11 pulse are 1001 which represents 9 (HEX). The clock 12 pulse has the control bits 0100 represented by a 4 (HEX). In FIG. 9 and in TABLE VII, the HEX2 characters for the four bits AC1, AC2, AC3 and AD are indicated for each of the CLK times 10 through 27. In a similar manner, each of the control signals AS2, AS1, AC4 and A/S for each clock time are combined into a single hexadecimal character. For the clock 10 time, the four control bits for the HEX1 character are C(HEX). Similarly, for CLK 11 he HEX1 character is B(HEX).

Referring to TABLE VII, the HEX2 characters for the clock times 13, 14, 15, 16 and 17 are E0C94 and for the HEX1 characters are 4DCBD. These values of HEX2 and HEX1 are repeated in each subsequent set of clock times 18 through 22, 23 through 27, and so on for each set of $N_i$ clock times. TABLE VII is for a 5-length DFT, that is, $N_i=5$ and therefore the HEX2 and HEX1 controls repeat every five clock times.

The repeated HEX1 and HEX2 character groups, like those of TABLE VII, for each of the DFT sizes 3, 5, 7, 9, 11 and 13 are set forth in the following TABLE VIII.

TABLE VIII

| | | DFT ADDER PROM DATA | | | | | | | | | | | | |
|---|---|---|---|---|---|---|---|---|---|---|---|---|---|---|
| DFT SIZE | CLK | 8 | 9 | 10 | 11 | 12 | 13 | 14 | 15 | 16 | 17 | 18 | 19 | 20 |
| 3 | HEX2 | F | 8 | 4 | | | | | | | | | | |
|   | HEX1 | 6 | 9 | D | | | | | | | | | | |
| 5 | HEX2 | E | 0 | C | 9 | 4 | | | | | | | | |
|   | HEX1 | 4 | D | C | B | D | | | | | | | | |
| 7 | HEX2 | E | 0 | C | 1 | C | 8 | 4 | | | | | | |
|   | HEX1 | 4 | D | C | F | C | 9 | D | | | | | | |
| 9 | HEX2 | E | 0 | C | 1 | C | 0 | C | 8 | 4 | | | | |
|   | HEX1 | 4 | D | C | F | C | D | C | 9 | D | | | | |
| 11 | HEX2 | E | 0 | C | 1 | C | 0 | C | 0 | C | 8 | 4 | | |
|   | HEX1 | 4 | D | C | F | C | D | C | D | C | 9 | D | | |
| 13 | HEX2 | E | 0 | C | 1 | C | 0 | C | 0 | C | 0 | C | 8 | 4 |

TABLE VIII-continued

| DFT SIZE | CLK | DFT ADDER PROM DATA | | | | | | | | | | | |
|---|---|---|---|---|---|---|---|---|---|---|---|---|---|
| | | 8 | 9 | 10 | 11 | 12 | 13 | 14 | 15 | 16 | 17 | 18 | 19 | 20 |
| | HEX1 | 4 | D | C | F | C | D | C | D | C | D | C | 9 | D |

With the control signals for a 5-length DFT size as indicated in TABLE VII and TABLE VIII, the adder circuit 45 of FIG. 7 performs additions on the reordered input data values both for the imaginary part and for the real part. Since the additions for the imaginary and real parts are the same, the following TABLE IX is applicable to both.

TABLE IX

| | DFT-5 ADDER DATA FLOW | | | | | | | | | |
|---|---|---|---|---|---|---|---|---|---|---|
| CLK | 10 | 11 | 12 | 13 | 14 | 15 | 16 | 17 | 18 | 19 |
| REG A | $x_1(0,0)$ | $x_1(1,1)$ | $x_1(4,4)$ | $x_1(2,2)$ | $x_1(3,3)$ | $x_1(0,5)$ | $x_1(1,6)$ | $x_1(4,9)$ | $x_1(2,7)$ | $x_1(3,8)$ |
| B | | $x_1(0,0)$ | $x_1(1,1)$ | | $x_1(2,2)$ | | $x_1(0,5)$ | $x_1(1,6)$ | | $x_1(2,7)$ |
| C | | $x_1(1,1)$ | $x_1(4,4)$ | | $x_1(3,3)$ | | $x_1(1,6)$ | $x_1(4,9)$ | | $x_1(3,8)$ |
| D | | | $x_1(0,0)$ | S14 | D14 | S23 | D23 | $x_1(0,5)$ | S69 | D69 |
| E | | | | $x_1(0,0)$ | S14 | | S23 | | $x_1(0,5)$ | S69 |
| F | | | | | $x_1(0,0)$ | | S0 | | $X_1(0,0)$ | x(5) |
| G | | | | | | | | | | $X_1(0,0)$ |
| H | | | | | | | | | | |
| OUT | | | | | | | | | | |
| CLK | 20 | 21 | 22 | 23 | 24 | 25 | 26 | | | |
| REG A | | | | | | | | | | |
| B | | | | | | | | | | |
| C | | | | | | | | | | |
| D | S78 | D78 | | | | | | | | |
| E | | S78 | | | | | | | | |
| F | | S5 | | $X_1(0,5)$ | | | | | | |
| G | | | | | $X_1(0,5)$ | | | | | |
| H | | | | | $X_1(0,0)$ | | | | | |
| OUT | | | | | | | $X_1(0,0)$ | | | |

In TABLE IX, the first value of reordered data $x_1(F_1,f_1)$ having the value of $x_1(0,0)$, is stored in the A register 181 and the A register 181 for the imaginary and real parts, respectively, at CLK 10 time. At CLK 10 time, as seen in TABLE VII, the AC1 signal is a logical 1. That logical 1 causes the $x_1(0,0)$ value to be clocked into the B register 182 and the $x_1(1,1)$ data value to be clocked into the C register 183 at CLK 11. At the same time, $x_1(1,1)$ is clocked into the A register 181 by the CLK signal. At CLK 11, as seen in TABLE VII, AC1 is again a logical 1. That logical 1 causes $x_1(1,1)$ to be clocked from the A register 181 into the B register 182 and causes $X_1(4,4)$ to be clocked into the C register 183. Also at CLK 12, $x_1(4,4)$ is clocked into the A register 181. Since at CLK 11, the AS1 signal is a logical 0, the output from the B register is selected by the multiplexer 190 allowing $x_1(0,0)$ to be clocked into the D register 184 at CLK 12. At CLK 12, A/S is a logical 1 causing the adder/subtractor 189 to function as an adder to add $x_1(1,1)$ and $x_1(4,4)$, the contents of the B register and the C register, forming the sum S14. At CLK 12, AS1 is now a logical 1 so that the output from the adder 189 is selected by the multiplexer 190 so that S14 is stored in the D register 184 at CLK 13. Also at CLK 13, $x_1(2,2)$ is clocked into register A and $x_1(0,0)$ is clocked into the E register 185 as a result of AC2 being a logical 1 at CLK 10 time.

At CLK 13, A/S is a logical 0 so that the function of the adder/subtractor 189 is as a subtractor. Subtractor 189 subtracts the contents $x_1(4,4)$ of the C register from the contents $x_1(1,1)$ of the B register to form the difference D14 which is selected by the multiplexer 191 and clocked into the D register 184 at CLK 14.

At CLK 13, the S14 value is available through the buffer 191 (imaginary portion) and the buffer 191' (real portion) to form an output on the bus 43 which serves as an input to the multiplier/accumulators 46-1 through 46-M of FIG. 7. The S14 value corresponds to the Eq.(26) summation for $F_i$ and $f_i$ equal to 1. Similarly the D14 value corresponds to the Eq.(27) difference for $F_i$ and $f_i$ equal to 1.

As indicated in TABLE IX, the sum term S23 and the difference term D23 correspond to the Eq.(26) and Eq.(27) values for $F_i$ and $f_i$ equal to 2.

For Eqs.(28), (29) and (30), $F_i$ for a 5-length DFT has only the values 1 and 2.

In TABLE IX, the summation of Eq.(28) is performed by the adder 192 for the imaginary part and the adder 192' for the real part. At CLK 14, the $x_1(0,0)$ term is in the F register 186 and the S14 value is in the E register 185. Adder 192 adds these values together to provide the S0 sum in the F register 186 at CLK 16. At CLK 16, the sum S23 is in the E register. During CLK 17, the S23 sum from the E register is added to the S0 sum in the F register to produce the $X_1(0,0)$ sum of Eq.(28) in the F register at CLK 18. The $X_1(0,0)$ sum of Eq.(28) is clocked into the G register at CLK 19 and to the H register at CLK 24. The value remains in the H register and is gated out at CLK 26 by control signal AD as is apparent from TABLE VI referring to CE DATA OUT (line 16). The next summation value for Eq.(28) appears in the G register at CLK 24, is available as an output from the H register at CLK 29 and is gated out at CLK 31. The data is gated out from the registers 188 and 188' onto the bus 44 under control of the AD signal from register 135 of FIG. 9.

Multiplier/Accumulator Operation

The real and imaginary data values on bus 43 to the multiplier/accumulator of FIG. 12 are derived as the outputs from the D registers 184 and 184' within the adder of FIG. 11. The contents of the D registers in FIG. 11 are clocked into the I register 226 of FIG. 12 each CLK time. The multiplier/accumulator device control 153 of FIG. 12 generates the control and other signals as previously described in connection with FIG. 10. The timing relationship of those control signals is shown in the following TABLE X.

Eqs.(29) and (30) with the summation for $F_i$ equal to 1 and 2 performed.

In a similar manner, the P register 235' and the Q

TABLE X

| | DFT-5 MULT/ACC DATA AND CONTROL | | | | | | | | | | | | | | | | | | | | | |
|---|---|---|---|---|---|---|---|---|---|---|---|---|---|---|---|---|---|---|---|---|---|---|
| CLK | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| REG. D | $x_1(0,0)$ | S14 | D14 | S23 | D23 | | | | | | | | | | | | | | | | | |
| REG. I | | $x_1(0,0)$ | S14 | D14 | S23 | D23 | | | | | | | | | | | | | | | | |
| G1($x_0$) | | 1 | | | | 1 | | | | 1 | | | 1 | | | 1 | | | 1 | | | |
| P4 | 1 | | | | | 1 | | | | 1 | | | 1 | | | 1 | | | 1 | | | |
| Ct-4 | | 0 | 1 | 2 | 3 | 4 | 0 | 1 | 2 | 3 | 4 | 0 | 1 | 2 | 3 | 4 | 0 | 1 | 2 | 3 | 4 | |
| cos ADR | | | | | | | | | | | | | | | | | | | | | | |
| COS | | | X | | X | | | | | | | | | | | | | | | | | |
| G2 (SUM) | | | 1 | | 1 | | | 1 | | 1 | | | 1 | | 1 | | | 1 | | 1 | | |
| ACC1 | | | 0 | | | | | 0 | | | | | 0 | | | | | 0 | | | 1 | |
| RND1 | | | | | 1 | | | | | 1 | | | | | 1 | | | | | 1 | | |
| sin ADR | | | | | | | | | | | | | | | | | | | | | | |
| SIN | | | | X | | X | | | | | | | | | | | | | | | | |
| G3 (DIF) | | | | 1 | | 1 | | | 1 | | 1 | | | 1 | | 1 | | | 1 | | 1 | |
| ACC2 | | | | 0 | | | | | 0 | | | | | 0 | | | | | 0 | | | |
| RND2 | | 1 | | | | 1 | | | | 1 | | | 1 | | | 1 | | | | 1 | | |
| G4 | | | | | 1 | | | | | 1 | | | 1 | | | 1 | | | | 1 | | |
| M/A1 | 1 | A | | | | 1 | A | | | 1 | A | | | 1 | A | | | | | | 1 | A |
| M/A2 | | | A | 1 | | | A | 1 | | | A | 1 | | | | A | 1 | | | | | |
| Data Out | | | | | | | | | | | | | | | | | $X_1(1,1)$ | | | $X_1(4,4)$ | | |

In TABLE X, the CLK times from 12 through 33 are the same clock times as previously described in connection with TABLE IX.

In TABLE X, the register D represents the contents of the D registers 184 and 184' in FIG. 11. The data in the D registers appear one clock cycle later in the I register of FIG. 12. The G1 control signal gates the $X_1(0,0)$ data value into the J register 227. The G2 signal clocks the S14 sum into the K register 228. The G3 control clocks the difference value D14 into the L register 229. The G1, G2 and G3 control signals occur at the CLK times 13, 14, and 15, respectively.

At CLK 14, the SUM term appears in the K register 228. At the same time, the cosine value on bus 158 is multiplied by the contents of register 228. The imaginary portion is multiplied in the multiplier 231 and the real portion is multiplied in the multiplier 232. This multiplication corresponds to the second term of Eq.(29) and of Eq.(30) for cosine values with $F_i$ and $P_i$ both equal to 1. The output from the multipliers 231 and 232 is immediately available as an input to the adders 233 and 234. At CLK 12 time the ACC1 input to the adders 233 and 234 is a logical 0 so that the products from multipliers 231 and 232 are passed through the adders 233 and 234 without change for storage in the N register 235 (imaginary portion) and the O register 236 (real portion) under control of the G3 control signal which occurs at CLK 15.

At CLK 16, the S23 SUM value is clocked into the K register 228. Again the multipliers 231 and 232 multiply the cosine value on bus 158 by the S23 value. This multiplication corresponds to the second term of Eq.(29) and Eq.(30) with $F_i$ equal to 2 and $P_i$ equal to 1. At CLK 16, the ACC1 signal has returned to a logical 1 and hence the contents of the registers 235 and 236 are added to the products from the multipliers 231 and 232, respectively, in the adders 233 and 234, respectively. At CLK 16, the RND1 signal is a logical 1 so that the adders 233 and 234 function to round off the addition for storage by the G2 signal in the registers 235 and 236 at CLK 17. The contents of the registers 235 and 236 corresponding to the full value of second term of register 236' store the imaginary and real portions of the third term in both Eqs.(29) and (30) with the summation for $F_i$ equal to 1 and 2 performed.

The contents of registers 235' and 236' are transferred to the T register 239' and the U register 240' by the G4 control at CLK 21.

In FIG. 12, the data values from registers 235 and 236 (corresponding to the second term of both Eq.(29) and Eq.(30)) is added to the first term of Eq.(29) and of Eq.(30) (stored in the M register 230) by the adders 237 and 238. The imaginary sum portion is stored in the register 239 and the real sum portion is stored in the S register 240 under control of the G4 signal which occurs at CLK 21.

Adder 241 adds the contents of registers 239 and 240' to form the imaginary portion of Eq.(29) for $P_i$ equal to 1. The subtractor 242 subtracts the contents of register 239' from the contents of the register 240 to provide the real portion of Eq.(29) for $P_i$ equal to 4. In a similar manner the subtractor 241' subtracts the contents of register 240' from the contents of register 239 to provide the imaginary portion of Eq.(30) for $P_i$ equal to 4. The adder 242' adds the contents of register 240 to the contents of register 239' to form the real portion of Eq.(30) for $P_i$ equal to 4. The Eq.(29) complex value from the adder 241 and subtractor 242 is clocked into the V register 243 by the G4 control signal at CLK 19. The Eq.(30) complex value from the subtractor 241' and the adder 242' is clocked into the W register 243' by the G4 control signal at CLK 19.

At CLK 19, the value of $X_i(P_i,p_i)$ for $P_i$ equal to 1 is designated as $X_1(1,1)$ and is in register 243 and the value for $P_i$ equal to 4, designated $X_1(4,4)$, is in register 243'. At the next G4 control time which occurs at CLK 24, these values in registers 243 and 243' are transferred to the X and Y registers 244 and 244', respectively.

While the multiplier/accumulator of FIG. 12 which is designated 46-1 in FIG. 7 is generating the values $X_1(1,1)$ and $X_1(4,4)$, another multiplier/accumulator of the FIG. 12 type (having a designation of 46-2 in FIG. 7 nomenclature where for the 5-length DFT M equals 2) is generating the values $X_1(2,2)$ and $X_1(3,3)$. The multiplier/accumulator 46-2 receives the same input values on the bus 43 of FIG. 12 as does the multiplier/accumulator 46-1. However, the sine and cosine values supplied on the buses 158 and 159 of FIG. 12 are different because the value in register 156 of FIG. 10 is 2 for multiplier/accumulator 46-2 as contrasted with 1 for multiplier/accumulator 46-1. The $X_1(2,2)$ and the $X_1(3,3)$ values appear in the registers 243 and 243' of FIG. 12 at CLK 26.

In FIG. 12, the data in the register 243 is gated out onto the bus 48 by the M/A1 control and the data from register 243' is gated out onto the bus 47 under control of the M/A2 signal. When the FIG. 12 circuit corresponds to the multiplier/accumulator 46-1 of FIG. 7, then the buses 48 and 47 in FIG. 12 correspond to the buses 48-1 and 47-1 of FIG. 7. The M/A1 and M/A2 control signals for the multiplier/accumulator 46-1 occur as shown in TABLE X using the logical 1 representation. Accordingly, the $X_1(1,1)$ data is gated out onto bus 48-1 at CLK 27 and the $X_1(4,4)$ data is gated out onto bus 47-1 at CLK 30.

In TABLE X, the timing for the M/A1 and M/A2 signals for the multiplier/accumulator 46-2 of FIG. 7 is also shown with the active state of the signals indicated by an A. Accordingly, the multiplier/accumulator circuit 46-2 of FIG. 7 gates out the $X_1(2,2)$ data value onto the bus 48-2 at CLK 28 and gates out the $X_1(3,3)$ data value onto the bus 47-1 at CLK 29. As previously explained and referring to FIG. 7, the adder circuit 45 gated out the $X_1(0,0)$ data value onto the bus 44 at CLK 26.

In the manner described, the processed output data $X_1$, $(P_1,p_1)$ from the computational element on bus 16 of FIG. 7 is in the order of $X_1(0,0)$, $X_1(1,1)$, $X_1(2,2)$, $X_1(3,3)$, $X_1(4,4)$ and so on until all N values of data appear on the output bus 16. The index $P_1$ has the N values 1, 1, ..., (N−1) while the index $P_1$ repeatedly has the $N_1$ (equal to 5) values 0, 1, ..., 4. The output data starts at CLK 26 and continues for N clock times. That output data on bus 16 from FIG. 7 is the input data on bus 16 to the memory element of FIG. 8. The memory element of FIG. 8 stores the data into the memory 69 in the reordered manner previously described.

While the TABLE X control described the timing for a 5-length DFT, the relationship between the control line signals remains the same relative to signal P4. Signal P4 occurs whenever (CLK-7) MOD($N_i$)=0. More particularly the following TABLE XI defines the active state of the various control signals for the multiplier/accumulator of FIG. 12 for difference sizes of DFT's. Note that the ACC1 and ACC2 signals in TABLE XI include a complementing line above them indicating that these are the inactive states of the ACC1 and ACC2 signals.

When the multiplier/accumulator circuit of FIG. 12 is employed in connection with 7-length, 9-length, and 13-length DFT's then the FIG. 7 computational element will include three, four, and six such multiplier/accumulator circuits, respectively. The output data $X_2(P_2,p_2)$ for the 7-length DFT will occur with $p_2$ having the values 0, 1, ..., (N−1) and with $P_2$ having the values 0, 1, ..., 6.

For the 9-length DFT, the processed data output values $X_3(P_3,p_3)$ have the values of $p_3$ equal to 0, 1, ..., (N−1) and the values of $P_3$ equal to 0, 1, ..., 8.

Finally for the 13-length DFT, the data output values $X_4(P_4,p_4)$ have $p_4$ equal to 0, 1, ..., (N−1) and $P_4$ equal to 0, 1, ..., 12.

TABLE XI

| CONTROL LINE | DFT MULT/ACC CONTROL LOGICAL "1" STATE |
|---|---|
| G1[×(0)] | (CLK-8) MOD ($N_i$) = 0 |
| P4 | (CLK-7) MOD ($N_i$) = 1 |
| G2 | (CLK-8) MOD ($N_i$) = ODD NUMBERS |
| $\overline{ACC1}$ | (CLK-9) MOD ($N_i$) = 0 |
| RNDI | (CLK-6) MOD ($N_i$) = 0 |
| G3 | (CLK-9) MOD ($N_i$) = ODD NUMBERS |
| $\overline{ACC2}$ | (CLK-10) MOD ($N_i$) = 0 |
| RND2 | (CLK-7) MOD ($N_i$) = 0 |
| G4 | (CLK-11) MOD ($N_i$) = 0 |

Pipeline Operation

Each of the single kernels for 5-length, 7-length, 9-length and 13-length DFT's are combined to form the 4095-length DFT in pipeline fashion as shown in the following TABLE XII.

TABLE XII

| 5-DFT | 7-DFT | 9-DFT | 13-DFT |  |  |
|---|---|---|---|---|---|
| I————I | ————I————I | ————I————I | ————I————I | ————I | |
| 9 | 8+N  36+N | 35+2N  69+2N | 68+3N  110+3N | 109+4N | |
| 26 | 25+N  57+N | 56+2N  94+2N | 93+3N  143+3N | 142+4N | |
| 7-1 . I——————————I | | | | | |
| 6-0 . . . . . . . . . . . . . . . . . . I+++++++++I | | | | | |
| 16-1 . . . I————II+++++++++I | | | | | |
| 6-1 . . . . . . . . . . . . . . . . . . . . I————I | | | | | |
| 7-2 . . . . . . . . . . . . . . . . . . . . . . . . . . . . . . I+++++++++I | | | | | |
| 16-2 . . . . . . . . . . . . . . . . . I————II+++++++++I | | | | | |
| 7-3 . . . . . . . . . . . . . . . . . . . . . . . . . . . . . . . . . . . . I————I | | | | | |
| 6-2 . . . . . . . . . . . . . . . . . . . . . . . . . . . . . . . . . . . . . . . . . . . . I+++++++++I | | | | | |
| 16-3 . . . . . . . . . . . . . . . . . . . . . . . . . . I————II+++++++++I | | | | | |
| 6-3 . . . . . . . . . . . . . . . . . . . . . . . . . . . . . . . . . . . . . . . . . . . . . . . . . . . I————I | | | | | |
| 7-4 . . . . . . . . . . . . . . . . . . . . . . . . . . . . . . . . . . . . . . . . . . . . . . . . . . . . . . . . . . . . . . . . I+++++++++I | | | | | |
| 16-4 . . . . . . . . . . . . . . . . . . . . . . . . . . . . . . . . . . . . . . . . . . . I————II+++++++++I | | | | | |
| | 5-DFT | 7-DFT | 9-DFT | 13-DFT | |
| I++++++++++++I++++++++++++++I++++++++++++++I++++++++++++++I | | | | | |
| 9+N | 8+2N  36+2N | 35+3N  69+3N | 68+4N  110+4N | 109+5N | |
| 26+N | 25+2N  57+2N | 56+3N  94+3N | 93+4N  143+4N | 142+5N | |

In TABLE XII and referring to FIG. 3, the input data $x_1(F_1,f_1)$ for the 5-length DFT occurs on the bus 7-1 between CLK 9 and CLK 9+N. The output data $X_1(P_1,p_1)$ from the computational element 11-1 occurs on bus 16-1 for CLK 26 until CLK 26+N. That output data is reordered as $X_1(k)$ and stored in the output memory 10-1 and is again reordered and output on the bus 6-1 as input data $x_2(F_2,f_2)$ to the computational element 11-2 during the time CLK 36+N until 36+2N.

The computational element 11-2 provides processed output data on bus 16-2 in accordance with the 7-length DFT over the period 57+N until 57+2N. The output data $X_2(P_2,p_2)$ from the computational element 11-2 on bus 16-2 is reordered as $X_2(k)$ and stored in the memory element 9-3. Memory element 9-3 again reorders that data as the input data $X_3(F_3,f_3)$ and makes it available on its output bus 7-3 from 69+2N until 69+3N.

The computational element 11-3 processes the input data in accordance with a 9-length DFT and provides the processed output data $X_3(P_3,p_3)$ from CLK 94+2N until 94+3N. The processed output data from the computational element 11-3 is reordered as $X_3(k)$ and stored in the output memory element 10-3. Memory element 10-3 again reorders the output data and makes it available on the output bus 6-3 as the input data $X_4(F_4,f_4)$ to the computational element 11-L which is 11-4.

The computational element 11-4 does a 13-length DFT and provides the processed output data $X_4(P_4,p_4)$ on the bus 16-4 which is reordered as $X_4(k)$ and stored in the memory element 10-4. The memory element 10-4 provides the output data $X_4(k)$ on bus 6-4 (bus 6) after the reordering is complete at CLK 147+4N.

At this point in time, a 4095-length DFT has been performed on the first N input data values x(n) which appeared on bus 5 of FIG. 3. A second set of N input data values is introduced into the FIG. 3 pipeline off-set from and overlapping with the processing of the first set N of input data values. The timing for the second set of N data values is shown by "+ + +" symbols while the first set of data values is shown by solid lines. Specifically, the reordered data for the second set of data values from the memory element 10-0 of FIG. 3 appears on the output bus 6-0 commencing at CLK 9+N. The computational element 16-1 does a 5-length DFT and provides output data on bus 16-1 during the period from 36+N until 36+2N. The processed out data from the computational element 11-1 is reordered and stored in the memory element 9-2. This processing of data by the FIG. 3 pipeline continues in the manner described taking the input data in sets of N. In this way, the pipeline computer of FIG. 3 continuously performs a 4095-length DFT in accordance with the present invention.

While the present invention has been described in connection with embodiments where the mutually prime factors are odd numbers, the invention also applies where not more than one of the prime factors is an even number. In a case where a single even value of $N_i$ is employed (for example 2), then both Eq.(20) and Eq.(21) are modified to include the additional term $+x(M)(-1)^{ki}$ and M would be equal to N/2.

For purposes of the following claims, the terms "transform" is intended to mean the forward transform, the inverse transform, or both as the context may permit. In general, the forward and inverse transforms only differ by the sign of the operator "j".

While the present invention has generally assumed that the data includes complex numbers having both real and imaginary parts, the invention applies equally well when the data is entirely real or entirely imaginary. Where the data is entirely real, for example, the apparatus in accordance with the present invention is employed using the imaginary data path to perform real calculations thereby increasing the speed of operation of the transform.

Also, an alternative implementation of the invention may be realized by interchanging the two indexing techniques used to map the input and output indexes n and k into L dimensions. In this alternative implementation, the first indexing technique defined by Equations (2)–(4) maps the output index k into the set of L indices $k_1, k_2, \ldots k_L$, and the second indexing technique defined by Equation (5) maps the input index n into the set of L indices $n_1, n_2, \ldots n_L$.

Specifically, in this alternative implementation, the input index mapping is:

$$n = [n_1(N/N_1) + n_2(N/N_2) + \ldots + n_L(N/N_L)] \bmod N$$

and the output index mapping is:

$$k = (k_1 R_1 + k_2 R_2 + \ldots + k_L R_L) \bmod N$$

where $R_i$, for $i=1$ to L, is defined by Equation (3).

For example, if the 4095-point DFT discussed above were implemented according to this alternative approach, Table I would correctly list the values of INC1 and INC2 if the column headings "Read From" and "Write Into" were interchanged.

While this invention has been particularly shown and described with reference to preferred embodiments thereof, it will be understood by those skilled in the art that various changes in form and details may be made therein without departing from the spirit and the scope of the invention.

What is claimed is:

1. Apparatus for writing a set of N data values into memory and then reading the data values out of the memory so as to reorder the data values into $N/N_i$ groups, each group consisting of $N_i$ data values, where N is the product of a set of prime factors $N_1, N_2, \ldots N_L$, and $N_i$ is one of said prime factors, comprising:
    a memory having N storage locations for storing N data values, the storage locations being designated by addresses respectively numbered from 1 to N;
    an address register for providing to the memory the address of a storage location to be accessed; and
    an address selector circuit, for storing successive values of the address in the address register, comprising
    a first register for storing a first increment, a second register for storing a second increment, a third register for storing a first quantity equal to the first increment minus N, a fourth register for storing a second quantity equal to the second increment minus N,
    first adder means for adding the address in said address register to said first increment for $N_i-1$ values in each group of $N_i$ data values and for adding the address in said address register to said second increment on the remaining one of the $N_i$ values in each group,
    second adder means for adding the address in said address register to the first quantity for $N_1-1$ values in each group and for adding the address in said address register to the second quantity for the remaining one of the $N_i$ values in each group, means for selecting a starting address as the first address for said address register, and means for storing in said address register as the next successive address the sum from either the second adder or the first adder, according to whether the sum from the second adder is positive or negative, respectively.

2. The apparatus of claim 1, wherein, when the apparatus is reading data out of memory, said second register stores said second increment as equal to 1 and said first register stores said first increment as the value $R_i$, where the value of $R_i$ satisfies the following equation for each value of $m = 1, 2, \ldots L$:

$$R_i \bmod N_m = \begin{cases} 1 \text{ for } i = m \\ 0 \text{ for } i \neq m \end{cases}$$

3. The apparatus of claim 2 wherein, when the apparatus is writing data into the memory, said first register stores said first increment equal to $N/N_i$ and said second register stores said second increment equal to $N + 1 - R_i + N/N_i$.

4. The apparatus of claim 1, wherein, when the apparatus is writing data into memory, said second register stores said second increment as equal to 1 and said first register stores said first increment as the value $R_i$, where the value of $R_i$ satisfies the following equation for each value of $m = 1, 2, \ldots L$:

$$R_i \bmod N_m = \begin{cases} 1 \text{ for } i = m \\ 0 \text{ for } i \neq m \end{cases}$$

5. The apparatus of claim 4 wherein, when the apparatus is reading data out of memory, said first register stores said first increment equal to $N/N_i$ and said register stores said second increment equal to $N + 1 - R_i + N/N_i$.

* * * * *